United States Patent
Mori

(10) Patent No.: US 7,651,211 B2
(45) Date of Patent: Jan. 26, 2010

(54) RECORDING METHOD AND PRINTED MATTER

(75) Inventor: Takashi Mori, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 284 days.

(21) Appl. No.: 11/886,704

(22) PCT Filed: Jan. 29, 2007

(86) PCT No.: PCT/JP2007/051833
§ 371 (c)(1), (2), (4) Date: Sep. 19, 2007

(87) PCT Pub. No.: WO2007/088983
PCT Pub. Date: Aug. 9, 2007

(65) Prior Publication Data
US 2009/0033704 A1 Feb. 5, 2009

(30) Foreign Application Priority Data
Jan. 31, 2006 (JP) .............................. 2006-023563

(51) Int. Cl.
*B41J 2/01* (2006.01)
(52) U.S. Cl. ........................................ 347/101; 347/14
(58) Field of Classification Search ................... 347/14, 347/16, 43, 96, 100, 101, 106
See application file for complete search history.

(56) References Cited

U.S. PATENT DOCUMENTS 6,084,610 A * 7/2000 Ozaki et al. ................... 347/43
6,161,928 A * 12/2000 Morikawa et al. ............. 347/96
6,595,623 B2 * 7/2003 Kotera et al. .................. 347/45
7,094,813 B2 8/2006 Namba et al.

(Continued)

FOREIGN PATENT DOCUMENTS

EP 1284199 A2 2/2003

(Continued)

OTHER PUBLICATIONS

Mar. 12, 2009 European search report in connection with a counterpart European patent Application No. 07 71 3797.

*Primary Examiner*—Lamson D Nguyen
(74) *Attorney, Agent, or Firm*—Cooper & Dunham, LLP

(57) ABSTRACT

A recording method with an ink ejected by an ink jet head, in which an ink repellent layer is formed on a surface of a nozzle plate of the ink jet head so that an opening portion for liquid ejections is established, the ink jet head being formed such that a cross-sectional area for the opening portion neighborhood of the ink repellent layer in a plane which is perpendicular to a centerline of the opening portion grows big sequentially as the cross-sectional area is further separated from the surface of the base material nozzle plate, wherein the amount of the ink transferred onto a recording medium during a contact time of 100 ms measured by a dynamic scanning absorptometer with environmental conditions of temperature 23° C. and relative humidity 50% RH is between 4 and 15 ml/m$^2$, and the amount of the ink transferred onto the recording medium during a contact time of 400 ms measured by the dynamic scanning absorptometer with the environmental conditions of temperature 23° C. and relative humidity 50% RH is between 7 and 20 ml/m$^2$.

16 Claims, 6 Drawing Sheets

U.S. PATENT DOCUMENTS

| | | |
|---|---|---|
| 2002/0175972 A1 | 11/2002 | Sanada |
| 2003/0194539 A1 | 10/2003 | Ohya et al. |
| 2005/0057601 A1 | 3/2005 | Kojima et al. |
| 2005/0231575 A1 | 10/2005 | Bannai et al. |
| 2007/0247492 A1 | 10/2007 | Mori |

FOREIGN PATENT DOCUMENTS

| | | |
|---|---|---|
| EP | 1775128 A1 | 4/2007 |
| JP | 10-264505 | 10/1998 |
| JP | 2001-232799 | 8/2001 |
| JP | 2003-19803 | 1/2003 |
| JP | 2003-72085 | 3/2003 |
| JP | 2003-72086 | 3/2003 |
| JP | 2004-84141 | 3/2004 |
| JP | 2006-51808 | 2/2006 |
| WO | WO 2005/090495 A1 | 9/2005 |
| WO | WO 2006/006682 A1 | 1/2006 |
| WO | WO 2007/046542 A1 | 4/2007 |

* cited by examiner

RECORDING METHOD AND PRINTED MATTER

TECHNICAL FIELD

The invention relates to a recording method which records imaging information into a recording medium using an ink jet recording method and printed matter.

BACKGROUND ART

Conventionally, as an image forming apparatus such as a printer, a facsimile, a copying machine, and a plotter, for example, there is an ink jet recording apparatus which forms images by ink. In such an ink jet recording apparatus, ink-repellent film is formed on a surface of the ink ejection side of an ink jet head because the image formation is performed by ejecting inks from a nozzle member.

Concerning such an ink jet head, in patent document 1, a processing method for forming an ink-repellent thin film by plasma polymerization with silicone oil is described and a nozzle plate of the ink jet head having the ink-repellent thin film thereof is described.

Also, in the invention of the patent document 2, after an ink-repellent film which is polymerized in fluoric resin or which is polymerized in silicone resin is formed, the ink-repellent film is heat-treated under an inert atmosphere excluding oxygen and water, and liquid raw materials included in the ink-repellent film are vaporized so that the ink-repellent film becomes rigid.

Patent Document 1: JP 2003-72085,A
Patent Document 2: JP 2003-72086,A

DISCLOSURE OF THE INVENTION

However, in the above patent documents 1 and 2, it is not considered that the shape of an edge portion of the nozzle hole circumference (a neighborhood of an edge for an opening portion) of the ink-repellent film be optimized.

That is, in general, the nozzle hole portion is masked and a water-repellent layer is formed, or after forming the water-repellent layer on the nozzle plate surface, the water-repellent layer for the nozzle hole portion is removed. In such cases, as shown in FIG. 8 (a), the ink-repellent film of an edge portion of the nozzle hole circumference has a shape such that as the cross-sectional area on a plane which is perpendicular to the centerline of the opening portion is separated from the nozzle plate, it becomes smaller, and is made into a shape having a peaked and sharpened edge (a peaked portion).

There is a possibility of exfoliating the ink-repellent film of the edge portion because a wiper contacts the edge portion as shown in FIG. 8 (b) when the nozzle surface having a shape shown in FIG. 8 (a) is wiped with the wiper 7 formed by a material like rubber.

Also, as shown in FIG. 8 (c), it is possible that a meniscus P be formed in a boundary region between the ink-repellent film 1 and the nozzle plate 2, and a meniscus Q be formed in a prong portion of the ink-repellent film 1 at the time of supplying of ink. Because of this, unevenness may occur in the jet stability of ink.

In addition, on the basis of a relationship between ink and a recording medium used for recording, a recording method is disclosed to utilize the recording performance of such an ink jet head to the maximum.

Therefore, it is a general object of the present invention to provide a recording method, in which an opening portion neighborhood from an opening portion edge of the ink-repellent film formed on a surface (nozzle plate) of the ink jet head base material is a shape that is hard to be exfoliated by wiping and the method is able to utilize the recording performance of the ink jet head to the maximum by using the ink jet head formed in a superior shape having the jet stability.

In order to achieve the above-mentioned object, there is provided according to one aspect of the present invention the recording method with the ink ejected by the ink jet head, in which an ink repellent layer is formed on a surface of a base material of an ink jet head where an opening portion for liquid ejections is established, and the ink jet head is formed such that as the cross-sectional area for the opening portion neighborhood of the ink repellent layer in a plane which is perpendicular to the centerline of the opening portion grows big sequentially as it is separating from the surface of the base material nozzle plate;

wherein the amount of the ink transferred onto the recording medium at a contact time of 100 ms measured by a dynamic scanning absorptometer with environmental conditions of temperature 23° C. and relative humidity 50% RH is between 4 and 15 ml/m$^2$, and the amount of the ink transferred onto the recording medium at a contact time of 400 ms measured by the dynamic scanning absorptometer with environmental conditions of temperature 23° C. and relative humidity 50% RH is between 7 and 20 ml/m$^2$.

Here, it is preferable that the amount of pure water transferred onto the recording medium at a contact time of 100 ms measured by the dynamic scanning absorptometer with environmental conditions of 23° C. and 50% RH be between 4 and 26 ml/m$^2$, and the amount of the pure water transferred onto the recording medium at a contact time of 400 ms measured by the dynamic scanning absorptometer with environmental conditions of 23° C. and 50% RH is between 5 and 29 ml/m$^2$.

It is preferable that the recording medium be composed of a support material and at least one coating layer on a surface of the support material.

It is preferable that the recording medium be composed of at least the support material and the coating layer, where the solid content of the coating layer is between 0.5 and 20 g/m$^2$.

It is preferable that the grammage of the recording medium be between 50 and 250 g/m$^2$.

It is preferable that the recording medium be supercalendered.

It is preferable that the recording medium contain kaolin as a pigment. The recording medium may contain heavy calcium carbonate as a pigment.

It is preferable that the recording medium contain a water-based resin. It is preferable that the water-based resin be a water-soluble resin or a water-dispersible resin.

It is preferable that the ink contain at least water, a colorant, and a humectant.

It is preferable that the surface tension of the ink at a temperature of 25° C. be between 15 and 40 mN/m.

It is preferable that the ink contain a dispersible colorant where the average particle diameter of the dispersible colorant is between 0.01 and 0.16 μm.

It is preferable that the viscosity of the ink at a temperature of 25° C. be between 1 and 30 mPa·sec.

It is preferable that the ink contain a fluorinated surfactant.

In order to achieve the above-mentioned object, there is provided according to another aspect of the present invention printed matter recorded in a recording medium with ink ejected by an ink jet head, in which an ink repellent layer is formed on a surface of a base material of an ink jet head where an opening portion for liquid ejections is established, the ink jet head being formed such that as the cross-sectional area for the opening portion neighborhood of the ink repellent layer in a plane which is perpendicular to the centerline of the opening portion grows big sequentially as separating from the surface of the base material nozzle plate, wherein the amount of the ink transferred onto the recording medium at a contact time of 100 ms measured by a dynamic scanning absorptometer with environmental conditions of temperature 23° C. and relative humidity 50% RH is between 4 and 15 ml/m$^2$, and the amount of the ink transferred onto the recording medium at a contact time of 400 ms measured by the dynamic scanning absorptometer with environmental conditions of temperature 23° C. and relative humidity 50% RH is between 7 and 20 ml/m$^2$.

According to the present invention, the recording method can be provided, in which a portion that is an opening portion neighborhood from an opening portion edge of the ink-repellent film formed on a surface of the ink jet head base material is a shape that is hard to cause exfoliation by wiping and the method is able to utilize the recording performance of the ink jet head to the maximum by using the ink jet head formed in a superior shape with jet stability and the recorded matter.

Other objects, features and advantages of the present invention will become more apparent from the following detailed description.

BEST MODE FOR CARRYING OUT THE INVENTION

Below, a description is given, with reference to the accompanying drawings, of an embodiment of the present invention.

<About an Ink Jet Head, a Cartridge Having the Ink Jet Head and an Ink Jet Recording Apparatus>

Figure 1:
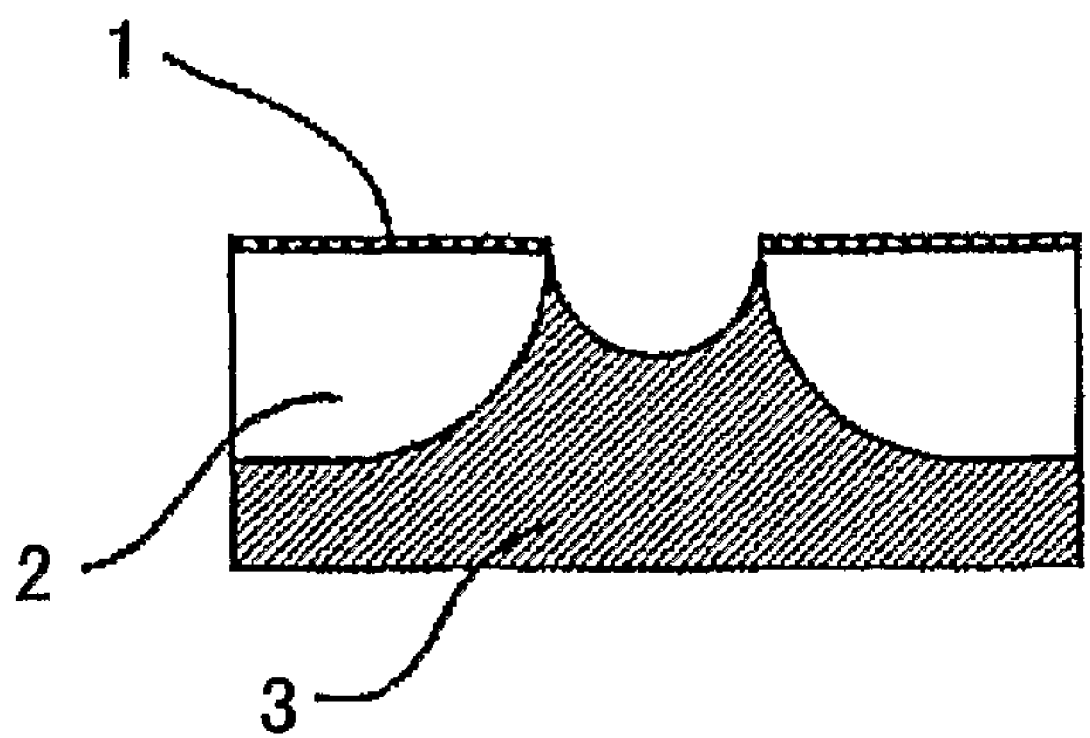
FIG. 1 is a sectional view of the ink jet head nozzle plate used in an embodiment of the present invention.
Figure 2:
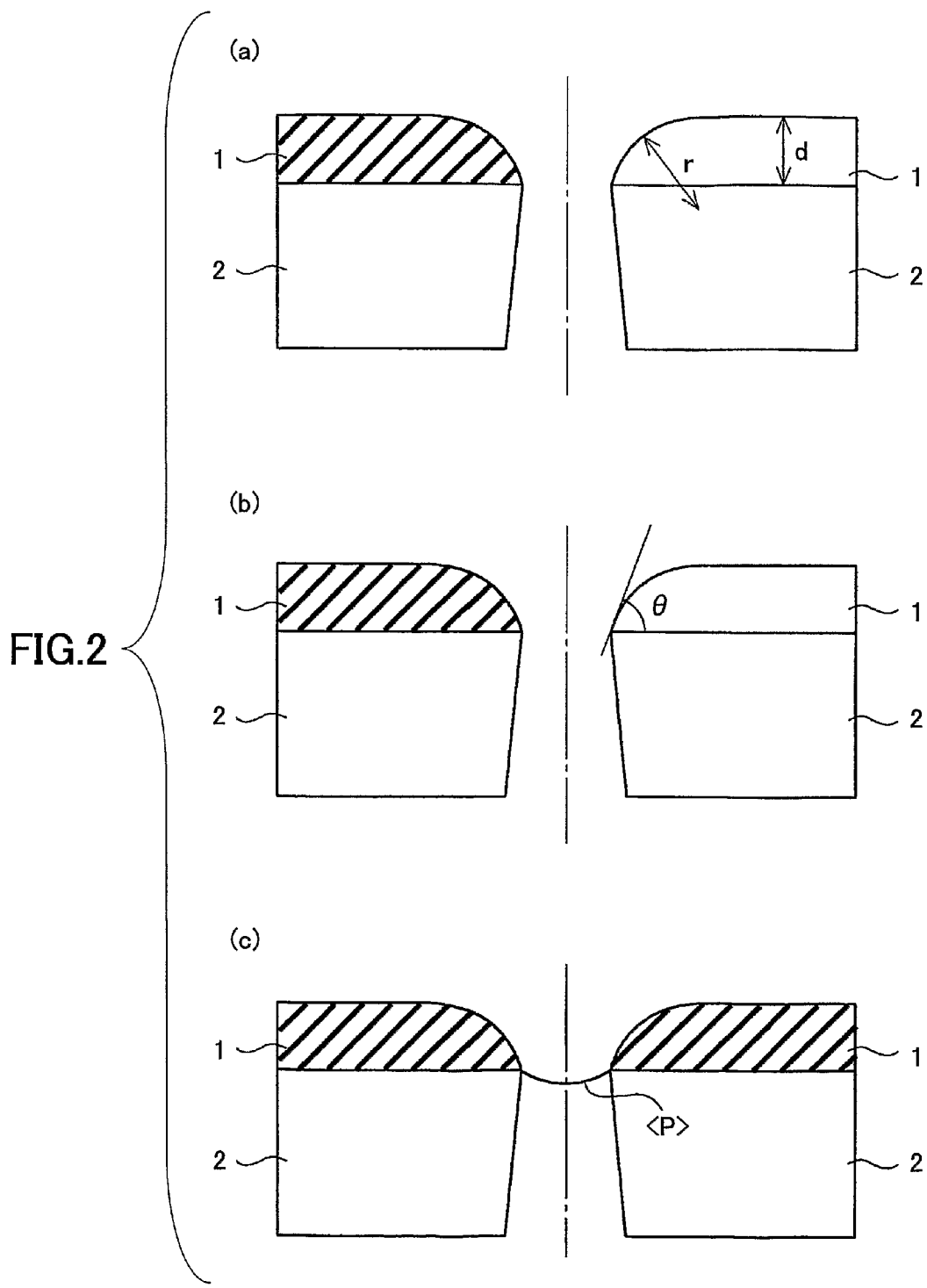
FIG. 2 is a figure which explains a characteristic of shape of the sectional view of FIG. 1.

FIGS. 1 and 2 are sectional views of the ink jet head nozzle plate manufactured in an embodiment of the present invention. In the embodiment, the nozzle plate 2 which is made of a base material of the ink jet head is manufactured by electroforming, the ink-repellent layer 1 which is a silicone resin film having 0.1 μm or above thickness is formed on a surface (the nozzle plate) of the ink jet head, and it is preferable that surface coarseness be Ra=0.2 or below. Also, it is more preferable that the thickness of the ink-repellent layer 1 be 0.5 μm or above.

As shown in FIG. 2 (c), when the ink 3 is supplied, a meniscus (a surface of liquid) P is formed at the boundary region between the ink-repellent layer 1 made of the silicone resin film and the nozzle plate 2.

The opening portion of the nozzle plate 2 is provided such that a cross section in a plane which is perpendicular to the centerline shown by a one-dash line in FIG. 2 is a circle centered on this centerline. Also, the ink-repellent layer 1 which is formed on the ink ejecting surface of the nozzle plate 2 is formed such that as the cross-sectional area for the opening portion in a plane which is perpendicular to this centerline is further separated from the nozzle plate 2, it grows big sequentially.

In more detail, as shown in FIG. 2 (a), the opening portion of the ink-repellent layer 1 has a rounded shape, in which a curve from the opening portion edge to the opening portion neighborhood of the nozzle plate 2 has a radius of curvature r. It is preferable that this radius of curvature r equal the thickness d except for the opening portion neighborhood of the ink-repellent layer 1.

This thickness d is a thickness except for the rounded portion which is the opening portion of the ink-repellent layer 1, and it is preferable that the thickness d be the maximum thickness of the ink-repellent layer.

Thereby, since the opening portion of the ink-repellent layer 1 is connected in succession with the opening portion of the nozzle plate 2, there is no shape having a peaked and sharpened edge (rounded shape not having a peaked shape) and also there is no rounded shape having a part which is caught, so that it is possible that the ink-repellent layer 1 will not be exfoliated from the nozzle plate 2 by catching the wiper at the peaked shape.

Also, as shown in FIG. 2 (b), it is preferable that a tangent line which contacts the opening portion edge of the ink-repellent layer 1 where there is a cross section in a plane including the centerline of the opening portion that makes an angle θ less than 90 degrees from the surface of the nozzle plate 2 including the opening portion edge of the nozzle plate 2 connected in succession to the opening portion edge.

Since the angle θ which is made by the tangent line which contacts the opening portion edge of the ink-repellent layer 1 and the surface 2 of the nozzle plate is less than 90 degrees, the meniscus (liquid surface) P is formed stably at the boundary region between the ink-repellent layer 1 and the nozzle plate 2 as shown in FIG. 2 (c), the possibility of form the meniscus at other regions can be greatly decreased.

Thereby, because the surface of the meniscus can be stabilized, the jet stability of the ink can be good when image formation is performed with the image forming apparatus using the ink jet head including the nozzle plate 2 of the present invention.

For silicone resin used in the present embodiment, a liquid silicone resin of room temperature hardening type is desirable, and one with hydrolysis reaction is particularly preferable. In the following example, SR2411 made by Toray Dow Corning Co., Ltd. was used.

The following table 1 is an evaluated result of the relationship for shape which is from the opening portion edge to the opening portion edge neighborhood of the nozzle plate 2 of the ink-repellent layer 1 of the ink jet head of the present embodiment concerned with ink collection at the nozzle circumference, edge detachment and jet stability.

TABLE 1

| EDGE SHAPE | | BUILD-UP OF INK | PEELING OF EDGE | SPRAY STABILITY |
|---|---|---|---|---|
| ANGULAR | | PARTLY OCCURRED | OCCURRED | GOOD |
| NOT ANGULAR (CURVED SHAPE) | θ ≦ 90° | NOT OCCURRED | NOT OCCURRED | GOOD |
| | θ > 90° | NOT OCCURRED | NOT OCCURRED | NOT GOOD |
| | r ≧ d | NOT OCCURRED | NOT OCCURRED | GOOD |
| | r < d | NOT OCCURRED | PARTLY OCCURRED | NOT GOOD |

For the ink jet head which shape has the peaked and sharpened edge at the edge portion (the opening portion edge neighborhood) of the ink-repellent layer 1, the ink collection at nozzle circumference was observed and the edge detachment by wiping occurred.

For ink jet heads having a rounded shape, the ink collection did not occur. However, for the ink jet head having a condition r<d as illustrated in FIG. 3 (a) as a comparison example, the edge detachment occurred in a part of the edge, for the ink jet head having a condition θ>90 degrees as illustrated in FIG. 3 (b), the result was that the jetting of drops is unstable.

Figure 3:
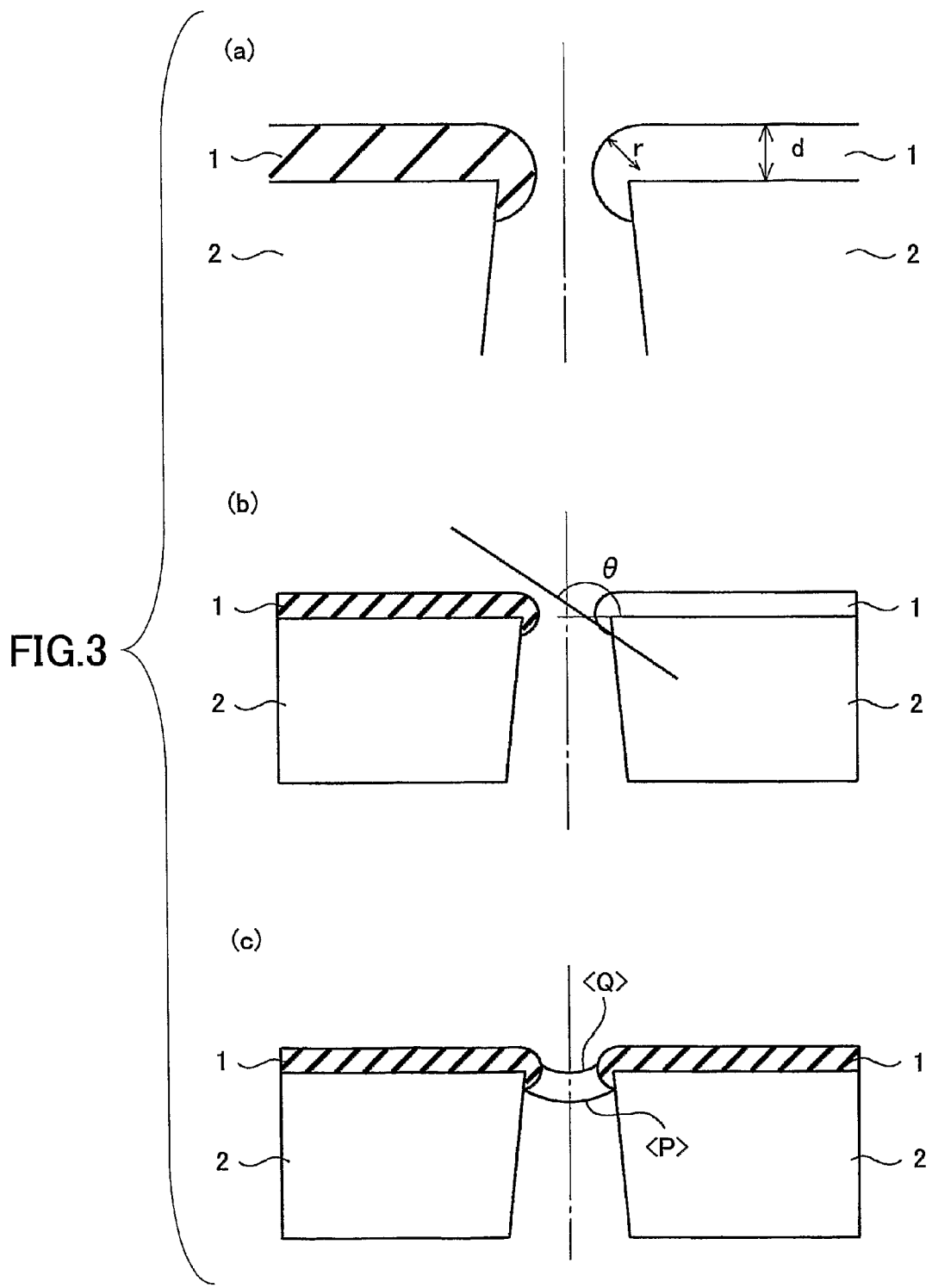
FIG. 3 is a figure which explains a characteristic of shape of comparison embodiment.

That is, as shown in FIG. 3 (c), there will be a possibility that the meniscus (liquid surface) P is formed stably at the boundary region between the ink-repellent layer 1 and the nozzle plate 2 when the ink 3 is supplied for the ink jet head having a condition of r<d and θ>90, and that the meniscus Q is formed at a salient (the part that the cross-sectional area that is perpendicular to the centerline in the opening portion is minimized) for the opening portion center in the ink-repellent layer 1. Because of this, a variation occurred in jet stability of ink when it formed an image with the image forming apparatus with the use of the ink jet head including such nozzle plate 2.

Next, a manufacturing method of the nozzle member of the ink jet head of the present embodiment as described above is explained.

Figure 4:
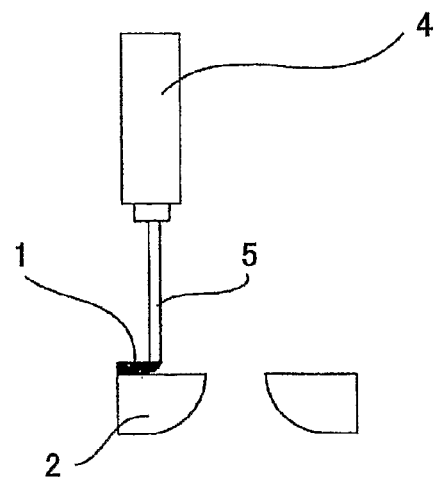
FIG. 4 is a figure showing a structure forming the ink-repellent layer 1 by coating used with dispenser 4 in an embodiment of the present invention.

FIG. 4 is a figure showing a structure forming the ink-repellent layer 1 by coating with silicone resin due to the coating used with dispenser 4 in the present embodiment.

The dispenser 4 for coating silicone resin is placed at the ejection side of ink of the nozzle 2 by Ni electrocasting, and the dispenser 4 is scanned as ejecting silicone from the tip of needle 5 to keep a predetermined certain distance space between the nozzle plate 2 and the tip of the needle 5, thereby, it is possible that a silicone resin film is formed on the ejection side of ink of the nozzle plate 2 selectively as shown in FIGS. 1 and 2 as described above.

The silicone resin used in the present embodiment is a normal temperature hardening type silicone resin SR2411 (made in Toray Dow Corning Co., Ltd.) with viscosity of 10 mPa·s. However, it is found that there was some silicone in the nozzle hole and a back side of the nozzle plate. The silicone resin film which was formed selectively in this way has the thickness of 1.2 μm and the surface coarseness (Ra) of 0.18 μm.

Figure 5:
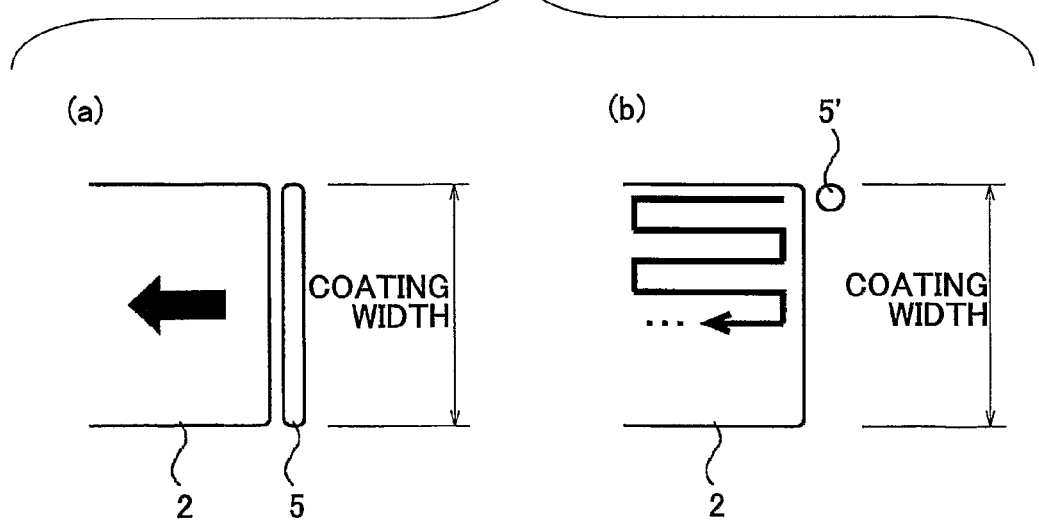
FIG. 5 (a) is a figure showing an embodiment of the present invention and FIG. 5 (b) is a figure showing a general structure of the present invention, in which the relationship between tip shape of needles and their coating movement.

As shown in FIG. 5 (a), an opening for coating at the tip of needle 5 of the present embodiment has a width sufficient only for coating the nozzle plate 2 which is the coating object. Thus, the dispenser 4 is scanned once in a coating direction, so that it coats the whole coating object.

That is, it is possible to scan in only one direction for coating; it is not necessary to change direction of the scanning to scan in an opposite direction as shown in FIG. 5 (b).

Here, as shown in FIG. 5 (b), since the tip of the needle 5 is narrower than the width to the nozzle plate 2 which is the coating object, it is necessary that the scanning direction for coating movement be changed 90 degrees and that it scans in an opposite direction on plural courses in order to complete coating the whole coating object, and it is difficult to coat with uniform thickness the whole coating object.

According to the present embodiment, the width of the opening for coating of the tip of the needle 5 equals the coating width of the nozzle plate 2 which is the coating object. Thereby, it is possible that the coating thickness for the whole application object is uniform and the surface finish has good precision.

Figure 6:
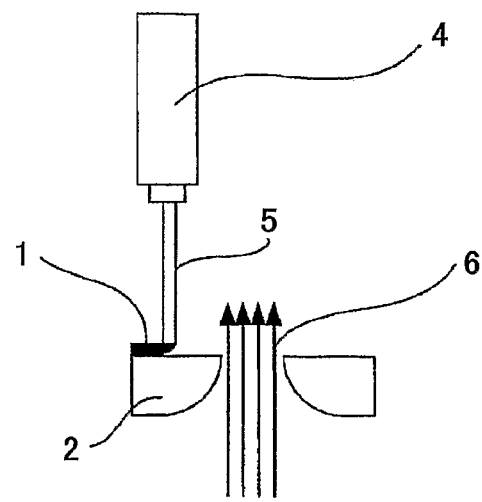
FIG. 6 is a figure showing a movement for forming the ink-repellent layer 1 by using the dispenser 4 in an embodiment of the present invention.

FIG. 6 is a figure showing a movement for coating by using the dispenser 4 in the present embodiment. The basic structure is the same as the structure of FIG. 4 as described above, and silicone is coated while jetting gas 6 from the nozzle hole (the opening portion) of the nozzle plate 2. As the gas 6, the gas is not limited as long as it is a gas with which it is hard to cause chemical reaction with silicone; various gases may be used, for example, even air is preferable.

The coating is performed by jetting the gas 6 from the nozzle hole, thereby the silicone resin film can be formed only on the nozzle surface except the nozzle hole of the nozzle plate.

Figure 7:
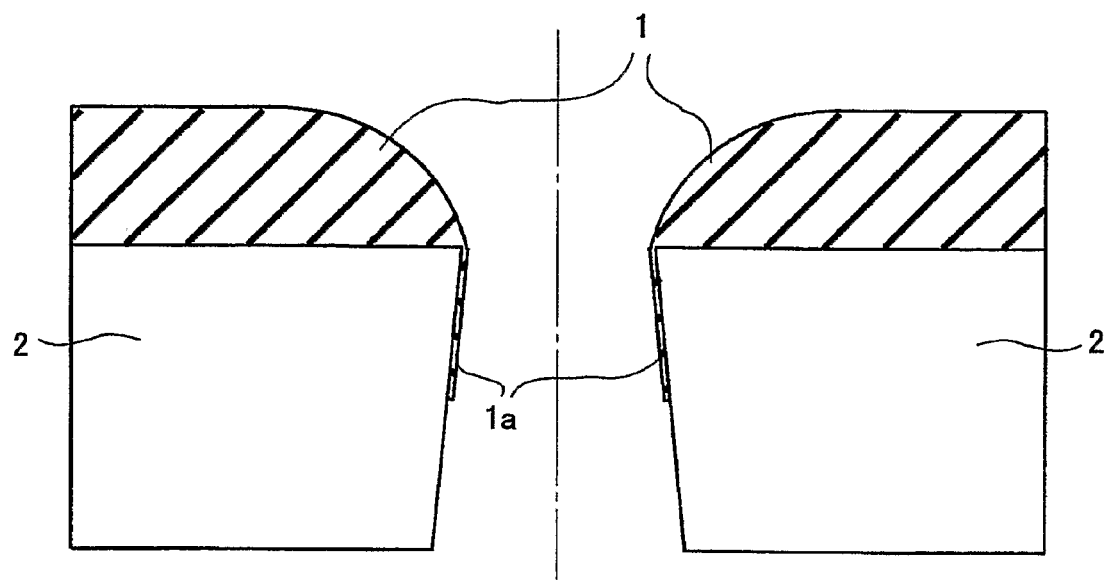
FIG. 7 is a sectional view showing the ink jet head nozzle plate in the case of forming the ink-repellent layer 1a of an inner wall of the opening portion and the ink-repellent layer 1 of an ink ejecting surface.
Figure 8:
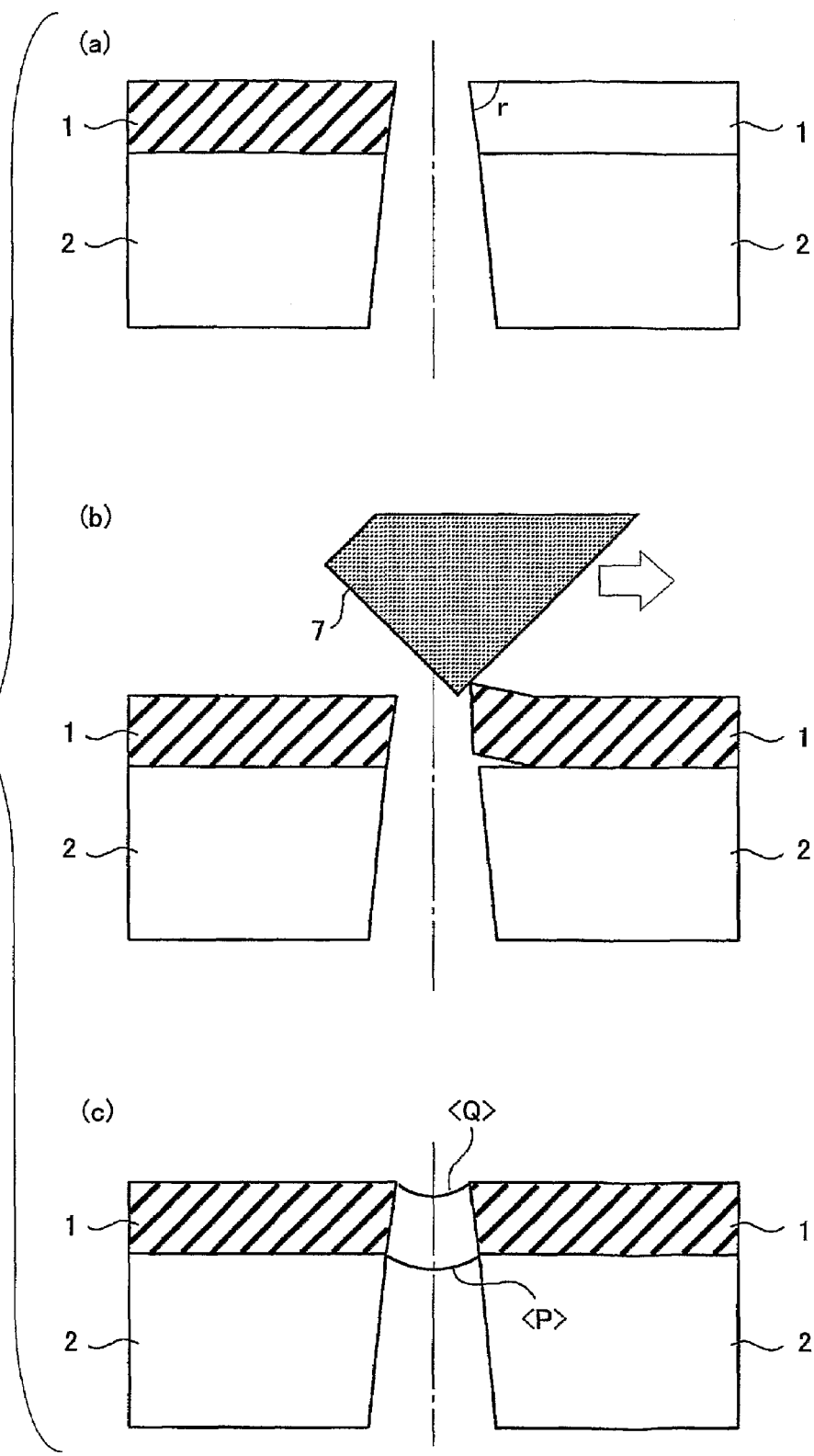
FIG. 8 is a sectional view showing the conventional ink jet head nozzle plate including the peaked and sharpned edge at the opening portion edge neighborhood.

Also, the coating is performed with the same silicone resin without jetting the gas 6 as described above. The silicone resin is inserted at the predetermined depth, then after that, the gas 6 is jetted from the nozzle 2; thereby the ink-repellent layer of the silicone resin can be formed extending to the desired depth (for example, several μm) of the inner wall of the nozzle as shown in FIG. 7.

That is, the ink-repellent thin layer 1a (the ink-repellent layer of the inner wall of the opening portion) can be formed from the opening portion edge of the nozzle plate 2 to the predetermined depth, in addition to the ink-repellent layer 1 on the ejection surface of the ink as described above.

Wiping was performed for the ink-repellent layer 1 of the nozzle plate made in this way using EPDM rubber (Rubber hardness 50 degrees). As a result, for 1,000 times of wiping, the ink-repellent layer of the nozzle plate was able to maintain good ink-repellent characteristics. Also, the nozzle member forming the ink-repellent layer was dipped into ink of 70° C. for 14 days. As a result, the same ink-repellent characteristics as well as the early period were able to be maintained afterward.

Comparison of ink-repellency for each ink is shown in table 2 using a nozzle plate (S1) forming the ink-repellent layer 1 of silicone resin according to the present embodiment and a nozzle plate (C1) which is plated of precipitate together with Ni/PTEE conventionally and is heat-treated at 350° C. for 60 minutes. The ink conditions for examining the ink-repellency are that surface tension was 20 mN/m or 35 mN/m, and the fluorine series surfactant was contained or the fluorine series surfactant was not contained. The fluorine series surfactant which was used is FS-300 (Dupont). For the present embodiment, it is preferable that the surface tension of the fluorine series surfactant which is used is low, for example, 70 mN/m is preferable, 50 mN/m is more preferable, 15-50 mN/m is even more preferable and 15-40 mN/m is the most preferable. Thus, wettability of ink is increased for a recording medium like paper and high-resolution printed matter can be obtained.

TABLE 2

| | SURFACE TENSION OF INK (mN/m) | | | |
|---|---|---|---|---|
| | 20 | | 35 | |
| EXISTENCE OR NON-EXISTENCE OF FLUORINE SERIES SURFACTANT | EXISTENCE | NONE | EXISTENCE | NONE |
| S1 (SILICONE RESIN) | ○ | ○ | ○ | ○ |
| C1 (FLUORIC RESIN) | X | X | X | ○ |

As shown in table 2, the surface tension was 20 mN/m and the ink-repellency was not obtained for the ink including the fluorine series surfactant about the conventional nozzle C1. In contrast, good ink-repellency was obtained for all inks when examination was performed with all inks for the nozzle plate S1 manufactured according to the present embodiment.

As for water-repellent materials comprising the ink-repellent layer 1 of the present embodiment, organic compounds having a fluorine atom, especially organic matter having a fluoroalkyl group, and organic silicide having a dimethylsilyxanthan frame can be used.

As for the organic compound having a fluorine atom, fluoroalkyl silane, alkane having fluoroalkyl group, carboxylic acid, alcohol, and amine are preferable. Concretely, as for fluoroalkyl silane, heptadecafluoro-1,1,2,2-tetrahydrodecyl-trimethoxysilane, heptadecafluoro-1,1,2,2-tetrahydrotrichlosilane are listed; as for alkane having fluoroalkyl group, octafluorocyclobutane, perfluoromethylcyclohexane, perfluoro-n-hexane, perfluoro-n-heptane, tetradecafluoro-2-methylpentane, perfluorododecane, perfluorooyco acid are listed; as for carboxylic acid having fluoroalkyl group, perfluoro decanoic acid, perfluoro octane acid are listed; as for alcohol having fluoroalkyl group, 3,3,4,4,5,5,5-heptafluoro-2-pentanol is lised; as for amine having fluoroalkyl group, heptadecafluoro-1,1,2,2-tetrahydrodecylamine is listed. As for organic silicide having dimethylsiloxane frame, α, w-bis(3-aminopropyl) polydimethyl siloxane, α, w-bis(3-glysideoxypropyl) polydimethyl siloxane, α, w-bis(vinyl) polydimethyl siloxane are listed.

Also, as for other water-repellent materials, organic compounds having a silicone atom, especially organic compounds having alkylsiloxane are listed.

As for organic compounds having alkylsiloxane, molecules comprising an alkyl siloxane epoxy resin component including the alkyl siloxane group, and as for alkyl siloxane epoxy resin having more than two of cyclic fatty series epoxy group, for example, large molecular compound (A) including structural units presented in general formulas (a) and (b) is listed.

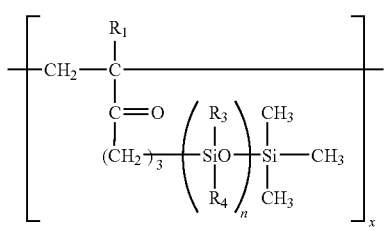

(a)

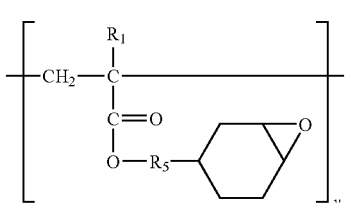

(b)

In the above chemical formulas (a) and (b), $x = 1\sim50$, $y = 2\sim100$, $n = 2\sim100$ integer
$R_1$ and $R_2$: Independently, ——H or ——$CH_3$ $R_3$ and $R_4$: Independently, ——$CH_3$ or 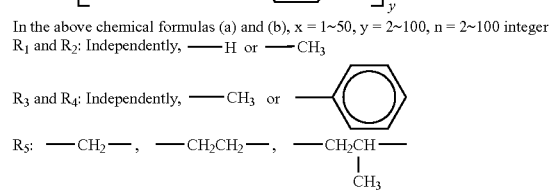

$R_5$: ——$CH_2$——, ——$CH_2CH_2$——, ——$CH_2CH$——
  |
  $CH_3$

The large molecular compound (A) including structure presented in general formulas (a) and (b) serves as a binder when the large molecular compound is used with other water-repellent compounds. That is, fitness for coating the ink-repellent component can be increased, and a function to improve work characteristics such as dry coating improving the dryness after a solvent evaporated can be provided.

Thus, in the present embodiment, since the ink-repellent layer 1 is formed by coating with the dispenser 4, materials for the ink-repellent layer 1, which materials are hardened in the air at ambient temperature, that is, materials not having been left at ambient temperature for a long time in the air, can be used.

Also, as described above, fluoric resin or silicone resin may be used for the material for the ink-repellent layer 1.

As above, for the ink jet head of the present embodiment, the ink-repellent layer 1 is formed on the surface of the ejecting side of the ink of the nozzle plate 2, and the opening portion of the ink-repellent layer 1, that is, from the opening portion edge to the opening portion edge neighborhood of the nozzle plate 2, is formed in a rounded shape.

Because of this, against an external force of wiping, its shape is such that the nozzle edge (the opening portion of the ink-repellent layer 1) is protected, and the ink jet head having high durability can be provided.

Also, for the ink jet head of the present embodiment, since the radius of curvature r of the rounded portion of the ink-repellent layer 1 formed on the surface of the nozzle plate 2 is greater than the thickness d at the opening portion of the ink-repellent layer 1, the detachment of the ink-repellent layer at the opening portion edge neighborhood of the ink-repellent layer 1 does not easily occur, and the ink jet head having good jet stability can be provided.

Also, for the ink jet head of the present embodiment, since a slope θ of the tangent line which contacts the rounded portion of the nozzle edge portion is less than 90 degrees, ink drops which are ejected do not contact the ink-repellent layer 1; thus the ink jet head having good jet stability can be provided.

Also, for the ink jet head of the present embodiment, since thickness d of the ink-repellent layer 1 formed on the surface of the head is less than 10 μm, the nozzle having high coherency and high durability can be provided.

Also, since the ink-repellent layer 1 formed on the nozzle plate of the ink jet head of the present embodiment may be made of fluoric resin, the remainder of ink after wiping does not easily occur and the jet stability can be obtained.

Also, since the ink-repellent layer 1 formed on the nozzle plate of the ink jet head of the present embodiment may be made of silicone resin, the mobility of ink is good, and the ink which bonds to the nozzle circumference is drawn into the nozzle hole easily so that the nozzle hole circumference can be always kept clean; thereby the jet stability can be obtained.

Also, the base material of the nozzle plate of the ink jet head of the present embodiment may be metal so that the stable ink jet head for which hardness is very preferable can be provided.

Also, the base material of the nozzle plate of the ink jet head of the present embodiment may be resin so that the ink jet head having high coherency with the ink-repellent layer 1 of the surface and high durability can be provided.

Also, in the manufacturing method of the ink jet head of the present embodiment, since the ink-repellent layer 1 can be formed in the air, the ink-repellent layer 1 can be easily formed with cheap facilities easily.

Also, in the manufacturing method of the ink jet head of the present embodiment, since the material of the ink-repellent layer is coated by the dispenser, a necessary amount of resin can be coated on a necessary place, a thickness d of the ink-repellent layer to be formed can be coordinated freely and precisely, and the ink-repellent layer 1 can be formed very cheaply.

Also, in the manufacturing method of the ink jet head of the present embodiment, since the resin is coated on the surface by jetting gas from the back side of the base material of the nozzle to the surface side via the nozzle hole of the base material of the nozzle using the dispenser, the nozzle hole can be prevented from being buried (covered) by the ink-repellent layer 1, and the ink-repellent layer 1 can be formed in high yield and very cheaply.

Also, in the manufacturing method of the ink jet head of the present embodiment, since gas is jetted from the back side of the base material of the nozzle to the surface side via the nozzle hole after coating the resin on the surface of the base material of the nozzle using the dispenser, a resin film can be coated on the inner wall of the nozzle hole to an arbitrary depth, and the ink-repellent layer 1 can be formed in high yield and very cheaply.

In addition, according to the ink jet head provided with the base material of the nozzle of the ink jet head of the present embodiment, the detachment of the ink-repellent layer is hard to make occur by wiping with the head cleaning, also because the ink jet head is superior in the jet stability, the ink jet head having high resolution and high durability can be provided.

In addition, according to a cartridge provided with the ink jet head of the present embodiment, the detachment of the ink-repellent layer of the head portion is hard to make occur by wiping with the head cleaning, also because the jet stability is superior, the cartridge with the ink jet head having high resolution and high durability can be provided.

Also, this cartridge may be used for ink exchange means of the ink jet head and this cartridge includes attaching means to attach to the main body of the ink jet recording apparatus, and it may be used for exchange.

Also, since the ink jet recording apparatus provided with the ink jet head of the present embodiment is equipped with the ink jet head of the above present embodiment, the ink jet recording apparatus having high durability and a stable jet performance can be provided cheaply.

Also, for the ink jet recording apparatus of the present embodiment, since the ink having low surface intension can be used, an improvement of fixing ink to the body to which the ink is adhered (for example, paper) is possible.

Also, for the ink jet recording apparatus of the present embodiment, since the ink which contains a fluorine series surfactant can be used, image forming in which a color development characteristic is preferable can be possible.

Also, for the ink jet recording apparatus of the present embodiment, since an ink including pigment may be used, even though using plain paper, high-resolution imaging superior in weatherability and water resistance is possible.

Here, conventionally, a method for using the fluoric resin is known as the ink-repellent layer of the nozzle plate of the ink jet head. For example, these are methods to plate a precipitate together of Ni/PTEE on the surface of the metallic nozzle plate and to form a thin film of PTEE on the surface of the nozzle plate by heating, and that to coat a fluorine series water-repellent agent on the surface of the metallic nozzle plate or the nozzle plate made by resin. In the case of the nozzle plate with the ink-repellent layer using the fluoric resin, it is possible to have good ink-repellency for ink including dye and ink including pigment in which the surface tension is greater than conventional, about 30 mN/m. However, it was difficult to have sufficient ink-repellency for an ink for which the surface tension is between 15 mN/m and 30 mN/m and an ink which has added the fluorine series surfactant.

Also, conventionally, a method has been provided in which the ink-repellent layer having good mobility of ink is formed by forming the silicone resin film on the surface of the nozzle plate of the ink jet head. As for the method, there are methods of vacuum deposition of the liquid silicone resin material and forming by plasma polymerization of silicone oil. For these methods, vacuum processing is needed at the time of making the layer, and large-scaled facilities are needed so that its manufacturing cost rises. Also, when a silicone resin film is made from methods such as the vacuum deposition or the plasma polymerization, because the time to make the film is long and the formed film is very thin, there is a problem in that defects such as pinholes are easily produced. Also, it is difficult to make the film thick for methods such as the vacuum deposition or the plasma polymerization, so it has been difficult to maintain a sufficient durability for the wiping and the ink.

Also, conventionally, a method has been provided in which the ink-repellent layer is formed on the surface of the nozzle plate by dipping the nozzle plate into a solution which dissolved the ink-repellent agent. However, air bubbles occur in the solution because the nozzle plate is dipped in the solution while jetting the gas. In the case of the type where the solution stiffens at room temperature, it is needed for the solution to be left in the air, and it is difficult to keep the liquid condition and control of the film thickness of the ink-repellent layer becomes impossible due to a change of viscosity of the solution.

In contrast to the conventional techniques, since the ink-repellent layer of the nozzle plate of the ink jet head of the present invention is such that the silicone resin film having a efficient ink-repellency to the surface of the nozzle plate and low surface tension is formed uniformly and flat, it is possible to have a sufficient ink-repellency for the ink having a low surface tension of 15-30 mN/m and the ink which added the fluorine series surfactant. Thus, since the film keeps the ink-repellency superior in sustainability and durability, the ink jet head where printing quality is preferable for a long term can be provided.

Also, in the ink-repellent processing method of the nozzle plate of the ink jet head of the present embodiment, it is characterized that the silicone resin film is formed on the surface of the nozzle plate uniformly and flat due to a method of coating the liquid silicone using the dispenser on the necessary place of the nozzle plate so that the nozzle hole is formed beforehand. The durability to the wiping and the ink resistance can be improved so that the thickness of the silicone resin film is 0.1 µm or above, more preferably the thickness of the silicone resin film is 0.5 µm or above.

Also, the ink which is left during the wiping can be decreased so that the surface coarseness of the silicone resin film Ra is 0.2 µm or below. It is desirable that the viscosity of the liquid silicone as a material is 1000 cp to form the surface which has flatness.

Also, in the ink-repellent processing method of the nozzle plate of the ink jet head of the present embodiment, while jetting gas from the nozzle hole, a silicone coat (a coating) in the dispenser is applied like the above, only on the surface of the nozzle plate, the ink-repellent layer of the silicone resin can be made by rigidifying silicone resin. After the silicone resin is coated on the surface of the nozzle plate, it is possible that the ink-repellent layer be formed down to the desired depth of the inner wall of the nozzle hole by jetting gas from the nozzle hole.

Also, it is characterized that the silicone resin as a material used for the ink-repellent process of the nozzle plate of the ink jet head of the present embodiment is the liquid silicone resin which is hardened by the ambient temperature or the elastomer. Thus, the silicone resin film having the durability can be formed by leaving the film for from several minutes to an hour in the atmosphere of room temperature after coating.

Also, it is characterized that the silicone resin as a material used for the ink-repellent process of the nozzle plate of the ink jet head of the present embodiment is the liquid silicone resin which is hardened by heating or the elastomer. Thus, the silicone resin film having the durability can be formed by heating for from several minutes to several tens of minutes at several tens of degrees Celsius to one hundred and several tens of degrees Celsius after coating.

Also, it is characterized that the silicone resin as a material used for the ink-repellent process of the nozzle plate of the ink jet head of the present embodiment is the liquid silicone resin which is hardened by ultra violet rays or the elastomer. Thus, the silicone resin film having the durability can be formed by irradiating ultraviolet rays of 500-1000 mJ/cm$^2$ after coating.

Thus, in the nozzle member of the ink jet head of the present embodiment, it is characterized that the thickness of the ink-repellent layer is 0.1 µm or above, more preferable 0.5 µm or above for the nozzle member of the ink jet head for which the ink-repellent layer made from the silicone resin is formed on the side of the ejection of the ink.

Since the layer having thickness of 0.1 µm or above is formed on the side of the ejection of the ink using the silicone resin uniformly and flat, the ink jet nozzle is superior in the durability against the wiping and the ink-repellency. Especially, the ink resistance can be improved due to the chemical resistance of the silicone resin.

Also, it is characterized that the surface coarseness of the silicone resin film Ra is 0.2 µm or below. Since the surface coarseness of the silicone resin film Ra is 0.2 µm or below, the surface characteristics are good condition, and there is little ink remainder after wiping.

Also, it is characterized that the above silicone resin is coated on the surface of the nozzle plate where the nozzle hole is formed beforehand using the dispenser.

Thus, since the liquid silicone resin is coated on the surface of the nozzle plate where the nozzle hole is formed beforehand using the dispenser, the ink-repellent film having no defect like a pinhole can be formed efficiently and selectively on the surface of the nozzle plate.

Also, it is characterized that the viscosity of the above silicone resin is 1000 cp (centipoise) or below.

Thus, since the viscosity of the liquid silicone is 1000 cp or below, the ink-repellent layer for which the surface characteristics are in good condition can be formed.

Also, it is characterized that the silicone resin is coated while jetting gas from the nozzle hole for the coating using the above dispenser.

Thus, since gas is jetting from the nozzle hole, introduction of the silicone to the nozzle inner wall and introduction of the silica to the back side can be completely prevented at the time of coating the liquid silicone.

Also, it is characterized that the silicone resin is coating on the surface of the nozzle plate, the silicone is immersed at the desirable depth of the nozzle hole, and then gas is jetted from the nozzle hole.

Thus, since gas is jetted from the nozzle hole after coating of the liquid silicone, it is possible that the silicone resin be coated down to the desired depth of the nozzle inner wall.

Also, the above silicone resin is the liquid silicone resin which is hardened by the ambient temperature or an elastomer. It is characterized that when the above silicone resin is coated on the surface of the nozzle plate, the ink-repellent film is formed by polymerization and hardening as leaving it in the air with ambient temperature.

Thus, since silicone resin which is hardened by the ambient temperature or the silicone elastomer as the silicone material is used, the hardening is progressed only being left in the air after coating the material to the nozzle surface, it is possible that the film is superior in durability and has good ink-repellency.

Also, it is characterized that the above silicone resin is the liquid silicone resin which is hardened by heating or the elastomer, it is coated on the surface of the nozzle plate, the hardening is progressed by heating process and the film having the ink-repellency is formed.

Thus, since the silicone resin which is hardened by heating or the silicone elastomer as the silicone material is used, the hardening progresses for a short time by heating after coating of the material onto the nozzle surface, and it is possible that the film has superior durability and has good the ink-repellency.

Also, it is characterized that the above silicone resin is the liquid silicone resin which is hardened by ultraviolet rays or the elastomer, it is coated on the surface of the nozzle plate, the hardening is progressed by irradiating ultraviolet rays and the film having the ink-repellency is formed.

Thus, since the silicone resin which is hardened by ultra violet rays or the silicone elastomer as the silicone material is used, the hardening is progressed for a short time by irradiating ultraviolet rays after coating of the material onto the nozzle surface, it is possible that the film is superior in durability and has good ink-repellency.

Also, it is characterized that the above nozzle member is used for the ink jet recording device of the present embodiment.

Thus, since the nozzle plate of the present embodiment is used, it is possible that the ink drop is ejected straight out and there are few ejection curves at the time of the ejection of ink.

Also, it is characterized that the surface tension of the ink which is used is 70 mN/m or below for the ink jet recording apparatus of the above present embodiment.

Thus, since the ink has low surface tension, it is possible that the fixing capability of the ink to the body (for example, paper) which is adhered is improved.

Also, it is preferable that the above ink include the fluorine series surfactant.

Thus, since the ink includes the fluorine series surfactant, the image formation having good color development can be possible.

Also, it is preferable that the ink include pigment.

Thus, since the ink includes pigment, even though using plain paper, high-resolution imaging superior in weatherability, and water resistance is possible.

<The Relationship Between the Nozzle Plate, the Ink and the Recording Media>

As described above, the nozzle plate of the present embodiment has excellent water repellency and ink repellency, and therefore formation of ink drops (particle) can be done well even when an ink with a low surface tension is used. This is so that a meniscus of ink is formed normally without the nozzle plate getting too wet. In the case that a meniscus is formed normally, when ink jets, ink is not pulled to one direction, and, as a result, there are few jet curves of ink, and pictures in which dot position precision is high can be obtained.

When printing on paper having low absorbency, the good or bad of dot position precision emerges in image quality conspicuously. In other words, because it is hard to spread ink on the paper having low absorbency, if the dot position precision becomes slightly low, the point where ink does not finish being buried in the paper in that is a region where white color is removed. This point that cannot finish being filled up leads to image density unevenness, a decline of image density, and it appears as a decline of image quality.

However, even though using the ink having low surface tension, the nozzle plate of the present embodiment has high dot position precision. Even if using a paper having low absorbency, printed matter of a high image quality can be obtained without image density unevenness and without a decline of image density so that ink can be buried in the paper.

<Media>

For example, paper for exclusive ink-jet use as media for recording (recording media) which is used for the present embodiment is composed of a support material and at least one coating layer on a surface of the base support. Also, the exemplary recording medium may have additional layers.

When the exemplary recording medium was brought into contact with an ink of this embodiment for 100 ms, the amount of the ink transferred onto the exemplary recording medium measured by a dynamic scanning absorptometer was between 4 and 15 ml/m$^2$. This value is preferably between 6 and 14 ml/m$^2$. The amount of pure water transferred onto the exemplary recording medium during a contact time of 100 ms is preferably between 4 and 26 ml/m$^2$, and more preferably between 8 and 25 ml/m$^2$. When the amount of transferred pure water or ink at a contact time of 100 ms is smaller than the preferable range, beading may occur. When the amount is larger than the preferable range, the diameter of a recorded ink dot may become smaller than a preferable diameter.

When the exemplary recording medium was brought into contact with an ink of this embodiment for 400 ms, the amount of the ink transferred onto the exemplary recording medium measured by a dynamic scanning absorptometer was between 7 and 20 ml/m$^2$. This value is preferably between 8 and 19 ml/m$^2$. The amount of pure water transferred onto the exemplary recording medium at a contact time of 400 ms is preferably between 5 and 29 ml/m$^2$, and more preferably between 10 and 28 ml/m$^2$. When the amount of transferred pure water or ink at a contact time of 400 ms is smaller than the preferable range, drying property becomes insufficient and spur marks may appear. When the amount is larger than the preferable range, bleeding may occur and the glossiness of an image after drying may become low.

Dynamic scanning absorptometer (DSA: JAPAN TAPPI JOURNAL, Volume 48, May 1994, pp. 88-92, Shigenori Kuga) is an apparatus that can accurately measure the amount of a liquid absorbed during a very short period of time. The dynamic scanning absorptometer directly reads the absorption speed of a liquid from the movement of a meniscus in a capillary and automatically measures the amount of the liquid absorbed. The test sample is shaped like a disk. The dynamic scanning absorptometer scans the test sample by moving an liquid-absorbing head spirally over the test sample and thereby measures the amount of the liquid absorbed at as many points as necessary. The scanning speed is automatically changed according to a predetermined pattern. A liquid supplying head that supplies liquid to the test sample is connected via a Teflon (registered trademark) tube to the capillary. Positions of the meniscus in the capillary are automatically detected by an optical sensor. In the above experiment, a dynamic scanning absorptometer (K350 series, type D, Kyowa Co., Ltd.) was used to measure the amount of transferred pure water or ink. The amount of transferred pure water or ink at a contact time of 100 ms or 400 ms is obtained by interpolation, using the transferred amounts measured at time points around each contact time. The measurement was performed in an environmental condition of 23° C. and relative humidity of 50% RH.

<Support Material>

Various materials may be used for the support material depending on the purpose of the paper. For example, a sheet of paper mainly made of wood fibers and a non-woven fabric mainly made of wood and synthetic fibers may be used.

A sheet of paper may be made of wood pulp or recycled pulp. Examples of wood pulp are leaf bleached kraft pulp (LBKP), needle bleached kraft pulp (NBKP), NBSP, LBSP, GP, and TMP.

As materials of recycled pulp, recycled papers in the list of standard qualities of recycled papers of the Paper Recycling Promotion Center may be used. For example, chemical pulp or high-yield pulp made of recycled papers may be used as the base material. Such recycled papers include printer papers such as non-coated computer paper, thermal paper, and pressure-sensitive paper; OA papers such as plain paper; coated papers such as art paper, ultra-lightweight coated paper, and matt paper; and non-coated papers such as bond paper, color bond paper, note paper, letter paper, wrapping paper, fancy paper, medium quality paper, newspaper, woody paper, supermarket flyers, simili paper, pure-white roll paper, and milk cartons. The above materials may be used individually or in combination.

Normally, recycled pulp is made by the following four steps:

(1) A defibrating step of breaking down used paper into fibers and separating ink from the fibers by using mechanical force and a chemical in a pulper.

(2) A dust removing step of removing foreign substances (such as plastic) and dust in the used paper by using, for example, a screen and a cleaner.

(3) A de-inking step of expelling the ink separated by a surfactant from the fibers by using a flotation method or a cleaning method.

(4) A bleaching method of bleaching the fibers by oxidization or reduction.

When mixing recycled pulp with wood pulp, the percentage of recycled pulp is preferably 40% or lower so that produced paper does not curl after recording.

As an internal filler for the support material, a conventional white pigment may be used. For example, the following substances may be used as a white pigment: an inorganic pigment such as precipitated calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithophone, zeolite, magnesium carbonate, or magnesium hydrate; and an organic pigment such as styrene plastic pigment, acrylic plastic pigment, polyethylene, microcapsule, urea resin, or melamine resin. The above substances may be used individually or in combination.

As an internal sizing agent used when producing the support material, a neutral resin size used for neutral papermaking, alkenyl succinic anhydride (ASA), alkyl ketene dimer (AKD), or a petroleum resin size may be used. Especially, a neutral resin size and alkenyl succinic anhydride are preferable. Alkyl ketene dimer has a high sizing effect and therefore provides enough sizing effect with a small amount. However, since alkyl ketene dimer reduces the friction coefficient of the surface of recording paper (medium), recording paper made using alkyl ketene dimer may cause slippage when being conveyed in an ink jet recording apparatus.

<Coating Layer>

The coating layer contains a pigment and a binder, and may also contain a surfactant and other components.

As a pigment, an inorganic pigment or a mixture of an inorganic pigment and an organic pigment may be used.

For example, kaolin, talc, heavy calcium carbonate, precipitated calcium carbonate, calcium sulfite, amorphous silica, alumina, titanium white, magnesium carbonate, titanium dioxide, aluminum hydroxide, calcium hydrate, magnesium hydrate, zinc hydroxide, or chlorite may be used as an inorganic pigment. Especially, kaolin provides a high gloss surface similar to that of an offset paper and is therefore preferable.

There are several types of kaolin, for example, delaminated kaolin, calcined kaolin, and engineered kaolin made by surface modification. To provide a high gloss surface, the mass percentage of a type of kaolin, in which 80 or more mass percent of particles have a diameter of 2 µm. or smaller, in the total amount of kaolin is preferably 50 percent or more.

The mass ratio of the binder to kaolin in the coating layer is preferably 100:50. If the mass ratio of kaolin is lower than 50, sufficient glossiness may not be obtained. There is no specific limit to the amount of kaolin. However, when the fluidity and the thickening property of kaolin under a high shearing force are taken into account, the mass ratio of kaolin is preferably 90 or lower in terms of coatability (ability to be coated).

As an organic pigment, a water-soluble dispersion of, for example, styrene-acrylic copolymer particles, styrene-butadiene copolymer particles, polystyrene particles, or polyethylene particles may be used. The above organic pigments may be used in combination.

The amount of an organic pigment in the total amount of pigment in the coating layer is preferably 2-20 mass percent. An organic pigment as described above has a specific gravity lower than that of an inorganic pigment and therefore provides a thick, high-gloss coating layer having good coatability. If the mass percentage of an organic pigment is less than 2 percent, a desired effect is not obtained. If the mass percentage of an organic pigment is more than 20 percent, the fluidity of a coating liquid becomes too low and, as a result, the efficiency of a coating process decreases and the operational costs increase.

Organic pigments can be divided into several types according to their particle shapes: solid-shape, hollow-shape, and doughnut-shape. To achieve a good balance between the glossiness, coatability, and fluidity of a coating liquid, an organic pigment having hollow-shaped particles with a void percentage of 40 percent or higher and an average diameter of between 0.2 and 3.0 µm is preferable.

As a binder, a water-based resin is preferably used.

As a water-based resin, a water-soluble resin or a water-dispersible resin may be used. Any type of water-based resin may be used depending on the purpose. For example, the following water-based resins may be used: polyvinyl alcohol; a modified polyvinyl alcohol such as anion-modified polyvinyl alcohol, cation-modified polyvinyl alcohol, or acetal-modified polyvinyl alcohol; polyurethane; polyvinyl pyrrolidone; a modified polyvinyl pyrrolidone such as polyvinyl pyrrolidone-vinyl acetate copolymer, vinyl pyrrolidone-dimethylaminoethyl methacrylate copolymer, quaternized vinyl pyrrolidone-dimethylaminoethyl methacrylate copolymer, or vinyl pyrrolidone-methacrylamide propyl trimethyl ammonium chloride copolymer; cellulose such as carboxymethyl cellulose, hydroxyethyl cellulose, or hydroxypropylcellulose; modified cellulose such as cationized hydroxyethyl cellulose; polyester, polyacrylic acid (ester), melamine resin, or modified versions of these substances; synthetic resin made of polyester-polyeurethane copolymer; and other substances such as poly(metha)acrylic acid, poly(metha)acrylamide, oxidized starch, phosphorylated starch, self-denatured starch, cationized starch, other modified starches, polyethylene oxide, polyacrylic acid soda, and alginic acid soda. The above substances may be used individually or in combination.

Among the above substances, polyvinyl alcohol, cation-modified polyvinyl alcohol, acetal-modified polyvinyl alcohol, polyester, polyurethane, and polyester-polyeurethane copolymer are especially preferable in terms of ink-absorption rate.

Any type of water-dispersible resin may be used depending on the purpose. For example, the following water-dispersible resins may be used: polyvinyl acetate, ethylene-polyvinyl acetate copolymer, polystyrene, styrene-(metha)acrylic ester copolymer, (metha)acrylic ester polymer, polyvinyl acetate-(metha)acrylic acid (ester) copolymer, styrene-butadiene copolymer, an ethylene-propylene copolymer, polyvinyl ether, and silicone-acrylic copolymer. A water-dispersible resin may contain a cross-linking agent such as methylol melamine, methylol hydroxypropylene urea, or isocyanate. Also, a self-crosslinking copolymer containing a unit of methylol acrylamide may be used as a water-dispersible resin. Two or more of the water-dispersible resins described above may be used at the same time.

The mass ratio of the water-based resin to the pigment in the coating layer is preferably 2:100 to 100:100, and more preferably 3:100 to 50:100. The amount of the water-based resin in the coating layer is determined so that the liquid-absorption rate of a recording medium falls within a specific range.

When a water-dispersible colorant is used, whether to mix a cationic organic compound in the binder is optional. For example, primary to tertiary amines that react with sulfonic groups, carboxyl groups, or amino groups of a direct dye or an acid dye in a water-soluble ink, and form insoluble salt; or a monomer, oligomer, or polymer of quarternary ammonium salt may be used. Among them, an oligomer and a polymer of quarternary ammonium salt are especially preferable.

As a cationic organic compound, the following substances may be used: dimethylamine-epichlorohydrin polycondensate, dimethylamine-ammonia-epichlorohydrin condensate, poly (trimethyl aminoethyl-methacrylate methylsulfate), diallylamine hydrochloride-acrylamide copolymer, poly (diallylamine hydrochloride-sulfur dioxide), polyallylamine hydrochlorid, poly (allylamine hydrochlorid-diallylamine hydrochloride), acrylamide-diallylamine copolymer, polyvinylamine copolymer, dicyandiamide, dicyandiamide-ammonium chloride-urea-formaldehyde condensate, polyalkylene polyamine-didyandiamide ammonium salt condensate, dimethyl diallyl ammonium chloride, poly diallyl methyl amine hydrochloride, poly (diallyl dimethyl ammonium chloride), poly (diallyl dimethyl ammonium chloride-sulfur dioxide), poly (diallyl dimethyl ammonium chloride-diallyl amine hydrochloride derivative), acrylamide-diallyl dimethyl ammonium chloride copolymer, acrylate-acrylamide-diallyl amine hydrochloride copolymer, polyethylenimine, ethylenimine derivative such as acrylamine polymer, and modified polyethylenimine alkylene oxide. The above substances may be used individually or in combination.

It is preferable to use a cationic organic compound with a low-molecular weight such as dimethylamine-epichlorohydrin polycondensate or polyallylamine hydrochlorid and a cationic organic compound with a relatively-high molecular weight such as poly (diallyl dimethyl ammonium chloride) in combination. Compared with a case where only one cationic organic compound is used, using cationic organic compounds in combination improves image density and reduces feathering.

The equivalent weight of cations in a cationic organic compound obtained by the colloid titration method (performed using polyvinyl potassium sulfate and toluidine blue) is preferably between 3 and 8 meq/g. With an equivalent weight in the above range, the dry deposit mass of the cationic organic compound falls within a preferable range. In the measurement of the equivalent weight of cations, the cationic organic compound is diluted with distilled water so that the solid content in the solution becomes 0.1 mass percent. No pH control is performed.

The dry deposit mass of the cationic organic compound is preferably between 0.3 and 2.0 g/m$^2$. If the dry deposit mass of the cationic organic compound is lower than 0.3 g/m$^2$, sufficient improvement in image density and sufficient reduction in feathering may not be achieved.

Any surfactant may be used depending on the purpose. For example, an anion surfactant, a cation surfactant, an amphoteric surfactant, or a nonionic surfactant may be used. Among the above surfactants, a nonionic surfactant is especially preferable. Adding a surfactant improves water resistance and density of an image, and thereby reduces bleeding.

For example, the following nonionic surfactants may be used: higher alcohol ethylene oxide adduct, alkylphenol ethylene oxide adduct, fatty acid ethylene oxide adduct, polyhydric alcohol fatty acid ester ethylene oxide adduct, higher aliphatic amine ethylene oxide adduct, fatty acid amide ethylene oxide adduct, fatty oil ethylene oxide adduct, ethylene oxide adduct of fat, polypropylene glycol ethylene oxide adduct, glycerol fatty acid ester, pentaerythritol fatty acid ester, sorbitol-sorbitan fatty acid ester, sucrose fatty acid ester, polyhydric alcohol alkyl ether, and alkanolamine fatty acid amide. The above substances may be used individually or in combination.

Polyhydric alcohol is not limited to a specific type and any type of polyhydric alcohol may be used depending on the purpose. For example, glycerol, trimethylolpropane, pentaerythrite, sorbitol, or surcose may be used. Ethylene oxide adduct may be made by replacing a part of ethylene oxide with an alkylene oxide such as propylene oxide or butylene oxide to the extent that the water solubility is not affected. The percentage of the replaced part is preferably 50 percent or lower. The hydrophile-lipophile balance (HLB) of a nonionic surfactant is preferably between 4 and 15, and more preferably between 7 and 13.

The mass ratio of the surfactant to the cationic organic compound is preferably 0:100 to 10:100, and more preferably 0.1:100 to 1:100.

Other components may also be added to the coating layer to the extent that its advantageous effects are not undermined. Examples of other components include additives such as an alumina powder, a pH adjuster, an antiseptic agent, and an antioxidant.

The method of forming the coating layer is not limited to a specific method. For example, the coating layer may be formed by impregnating the base material with a coating liquid or by applying a coating liquid to the base material. For the impregnation or application of a coating liquid, a coater such as a conventional size press, a gate roll size press, a film transfer size press, a blade coater, a rod coater, an air knife coater, or a curtain coater may be used. Also, using a conventional size press, a gate roll size press, or a film transfer size press attached to a paper machine for the impregnation or application of a coating liquid may improve the efficiency of the process.

There is no specific limit to the amount of a coating liquid on the base material. However, the solid content of a coating liquid on the base material is preferably between 0.5 and 20 g/m, and more preferably between 1 and 15 g/m$^2$.

When it is less than 0.5 g/m$^2$, because ink cannot be taken in enough, ink overflows, and a blur of letters occurs. On the other hand, when it is over than 20 g/m$^2$, a property of paper is lost, and malfunction occurs. It is hard to be bent. Even more particularly, it is hard to be written on.

After the impregnation or application of a coating liquid, the coating liquid may be dried. The temperature for this drying process is preferably between 100 and 250° C., but is not limited to the specific range.

The recording medium of the present embodiment may also have a back layer on the back of the support material, and other layers between the support material and the coating layer or between the support material and the back layer. Also, a protective layer may be provided on the coating layer. Each of the layers may be composed of one layer or multiple layers.

In the case that absorbency of liquid is within the above range of the present invention, the recording medium of the present embodiment may be commercially available coated paper for offset printing, and coated paper for gravure other than recording media used for ink jet printing.

It is preferable that grammage of the recording medium of the present embodiment be between 50 and 250 g/m$^2$. When it is less than 50 g/m$^2$, it is easy to produce poor transportation so that the recording medium is clogged on the way of a transportation course so that there is no strength. When the grammage of the recording medium is greater than 250 g/m$^2$, the recording medium cannot finish turning in a curve part on the way of the transportation course so that the strength of paper becomes too high, thereby it is easy to produce poor transportation in that the recording medium is clogged.

Ink

An ink according to an embodiment of the present invention contains at least water, a colorant, and a humectant, and may also include a penetrant, a surfactant, and other components.

The surface tension of an ink according to an embodiment of the present invention at 25° C. is preferably between 15 and 40 mN/m, and more preferably between 20 and 35 mN/m. When the surface tension of an ink is less than 15 mN/m, the wettability of the nozzle plate to the ink becomes too high. As a result, ink drops may not be formed normally, bleeding may occur on a recording medium of this embodiment, and ink spray stability may be reduced. When the surface tension of an ink is more than 40 mN/m, the penetration capability of the ink is reduced, beading may occur, and the drying time may become longer.

The surface tension of an ink is measured, for example, by a surface tensiometer (for example, CBVP-Z of Kyowa Interface Science Co., Ltd.) with a platinum plate at a temperature of 25° C.

Colorant

As a colorant, a pigment, a dye, and colored particles may be used individually or in combination.

As colored particles, an aqueous dispersion liquid of polymer micro-particles containing at least a pigment or a dye as a colorant is preferably used.

"Containing" in this case means that a colorant is encapsulated in the polymer micro-particles, a colorant is absorbed by the polymer micro-particles, or both. However, a colorant may not be necessarily encapsulated in or absorbed by polymer micro-particles, but may be dispersed in an emulsion as long as the resulting ink has characteristics suitable for the present invention. Any water-insoluble or poorly water-soluble colorant that can be absorbed by polymer micro-particles may be used depending on the purpose.

"Water-insoluble" or "poorly water-soluble" in this case indicates that the maximum amount of a colorant that can dissolve in water at a temperature of 20° C. is less than a mass ratio of 10:100 (colorant:water). Also, "dissolve" means that no separation or sediment of a colorant is identified on the surface or bottom of the solution by eye observation.

The volume average particle diameter of a polymer micro-particle (colored particle) containing a colorant is preferably between 0.01 and 0.16 μm in an ink. When the volume average particle diameter is less than 0.01 μm, the fluidity of polymer micro-particles becomes very high and, as a result, bleeding may occur or the light resistance of the ink may become low. When the volume average particle diameter is more than 0.16 μm, nozzles may be clogged or color development of the ink may be inhibited.

As a colorant, for example, a water-soluble dye, an oil-soluble dye, a dispersed dye, or a pigment may be used. An oil-soluble dye or a dispersed dye is preferable in terms of absorbability and encapsulation. A pigment is preferable in terms of the light resistance of an image formed.

To be efficiently absorbed by polymer microparticles, the amount of a dye soluble in an organic solvent, such as a ketone solvent, is preferably 2 g/l or more, and more preferably between 20 and 600 g/l.

As a water-soluble dye, a dye categorized as an acid dye, a direct dye, a basic dye, a reactive dye, or a food dye in the Color Index may be used. Especially, a dye with high water resistance and high light resistance is preferable.

For example, the following acid dyes and food dyes may be used: C. I. Acid Yellow 17, 23, 42, 44, 79, 142; C. I. Acid Red 1, 8, 13, 14, 18, 26, 27, 35, 37, 42, 52, 82, 87, 89, 92, 97, 106, 111, 114, 115, 134, 186, 249, 254, 289; C. I. Acid Blue 9, 29, 45, 92, 249; C. I. Acid Black 1, 2, 7, 24, 26, 94; C. I. Food Yellow 3, 4; C. I. Food Red 7, 9, 14; and C. I. Food Black 1, 2.

For example, the following direct dyes may be used: C. I. Direct Yellow 1, 12, 24, 26, 33, 44, 50, 86, 120, 132, 142, 144; C. I. Direct Red 1, 4, 9, 13, 17, 20, 28, 31, 39, 80, 81, 83, 89, 225, 227; C. I. Direct Orange 26, 29, 62, 102; C. I. Direct Blue 1, 2, 6, 15, 22, 25, 71, 76, 79, 86, 87, 90, 98, 163, 165, 199, 202; and C. I. Direct Black 19, 22, 32, 38, 51, 56, 71, 74, 75, 77, 154, 168, 171.

For example, the following basic dyes may be used: C. I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C. I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C. I. Basic Black 2, 8.

For example, the following reactive dyes may be used: C. I. Reactive Black 3, 4, 7, 11, 12, 17; C. I. Reactive Yellow 1, 5, 11, 13, 14, 20, 21, 22, 25, 40, 47, 51, 55, 65, 67; C. I. Reactive Red 1, 14, 17, 25, 26, 32, 37, 44, 46, 55, 60, 66, 74, 79, 96, 97; and C. I. Reactive Blue 1, 2, 7, 14, 15, 23, 32, 35, 38, 41, 63, 80, 95.

Any pigment, either an inorganic pigment or an organic pigment, may be used depending on the purpose.

For example, the following inorganic pigments may be used: titanium oxide, iron oxide, calcium carbonate, barium sulfate, aluminum hydroxide, barium yellow, cadmium red, chrome yellow, and carbon black. Among them, carbon black is especially preferable. Carbon blacks produced by a contact method, a furnace method, or a thermal method may be used.

The following organic pigments, for example, may be used: azo pigment, polycyclic pigment, dye chelate, nitro pigment, nitroso pigment, and aniline black. Especially, azo pigment and polycyclic pigment are preferable. As an azo pigment, for example, azo lake pigment, insoluble azo pigment, condensed azo pigment, or chelate azo pigment may be used. As a polycyclic pigment, for example, phthalocyanine pigment, perylene pigment, perynone pigment, anthraquinone pigment, quinacridone pigment, dioxazine pigment, indigo pigment, thioindigo pigment, isoindolinon pigment, or quinofraron pigment may be used. As a dye chelate, for example, basic dye chelate or acid dye chelate may be used.

A pigment of any color, for example, a black pigment or a color pigment, may be used depending on the purpose. The above substances may be used individually or in combination.

For a black ink, for example, the following pigments may be used: a carbon black (C. I. Pigment Black 11) such as furnace black, lamp black, acetylene black, or channel black; a metallic pigment such as copper, iron (C. I. Pigment Black 11), or titanium oxide pigment; and an organic pigment such as aniline black.

For a yellow ink, for example, the following pigments may be used: C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 128, 138, 150, 153.

For a magenta ink, for example, the following pigments may be used: C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209, 219.

For a cyan ink, for example, the following pigments may be used: C. I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, 63.

For neutral colors such as red, green, and blue, for example, the following pigments may be used: C. I. Pigment Red 177, 194, 224; C. I. Pigment Orange 43; C. I. Pigment Violet 3, 19, 23, 37; and C. I. Pigment Green 7, 36.

As a pigment, a self-dispersing pigment is preferable. A self-dispersing pigment has at least one type of hydrophilic group attached directly or via another atomic group to its surface, and is therefore stably dispersible without using a dispersing agent. Especially, an ionic self-dispersing pigment such as an anionic self-dispersing pigment or a cationic self-dispersing pigment is preferable.

The volume average particle diameter of a self-dispersing pigment is preferably between 0.01 and 0.16 μm in an ink.

Examples of anionic hydrophilic groups include —COOM, —SO3M, —PO3HM, —PO3M2, —SO2NH2, and —SO2NHCOR (in the formulas, M indicates a hydrogen atom, alkali metal, ammonium, or organic ammonium; and R indicates an alkyl group with 1-12 carbon atoms, a phenyl group with or without a substituent group, or a naphthyl group with or without a substituent group). A color pigment with —COOM or —SO3M attached to its surface is especially preferable.

Examples of alkali metals indicated by M in the hydrophilic groups include lithium, sodium, and potassium. Examples of organic ammoniums include monomethyl or trimethyl ammonium, monoethyl or triethyl ammonium, and monomethanol or trimethanol ammonium. To attach —COONa to the surface of a color pigment and thereby to obtain an anionic color pigment, the color pigment is, for example, oxidized with sodium hypochlorite, sulfonated, or reacted with diazonium salt.

As a cationic hydrophilic group, a quaternary ammonium group is preferable. Especially, quaternary ammonium groups represented by the formulas shown below are preferable. A colorant containing a pigment with any one of the quaternary ammonium groups attached to its surface is preferably used.

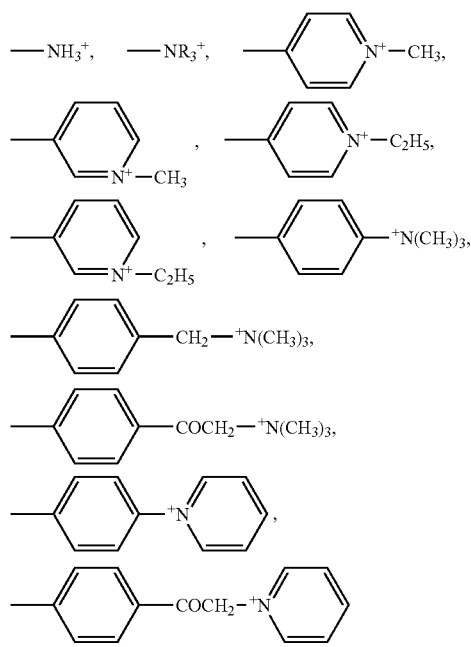

Any method may be used to produce a cationic self-dispersing carbon black having a hydrophilic group depending on the purpose. For example, to attach an N-ethyl-pyridyl group represented by the formula shown below, a carbon black is processed with 3-amino-N-ethylpyridium bromide.

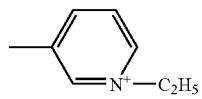

A hydrophilic group may be attached to the surface of a carbon black via another atomic group. As such an atomic group, for example, an alkyl group with 1-12 carbon atoms, a phenyl group with or without a substituent group, or a naphthyl group with or without a substituent group may be used. Exemplary combinations of a hydrophilic group and an atomic group to be attached to the surface of a carbon black include —C2H4COOM (M indicates alkali metal or quaternary ammonium), —PhSO3M (Ph indicates a phenyl group and M indicates alkali metal or quaternary ammonium), and —C5H10NH3+.

Also, a pigment dispersion liquid with a pigment dispersing agent may be used.

Natural hydrophilic polymers usable as pigment dispersing agents include vegetable polymers such as acacia gum, tragacanth gum, goor gum, karaya gum, locust bean gum, arabinogalactan, pectin, and quince seed starch; seaweed polymers such as alginic acid, carrageenan, and agar; animal polymers such as gelatin, casein, albumin, and collagen; and microbial polymers such as xanthene gum and dextran. Semisynthetic polymers usable as pigment dispersing agents include cellulose polymers such as methyl cellulose, ethyl cellulose, hydroxyethyl cellulose, hydroxypropyl cellulose, and carboxymethyl cellulose; starch polymers such as sodium carboxymethyl starch and starch glycolic acid sodium; and seaweed polymers such as sodium alginate and propylene glycol esters alginate. Synthetic polymers usable as pigment dispersing agents include vinyl polymers such as polyvinyl alcohol, polyvinylpyrrolidone, and polyvinyl methyl ether; acrylic resins such as non-crosslinked polyacrylamide, polyacrylic acid, alkali metal salt of polyacrylic acid, and water-soluble styrene acrylic resin; water-soluble styrene-maleic acid resin; water-soluble vinylnaphthalene acrylic resin; water soluble vinylnaphthalene-maleic acid resin, polyvinylpyrrolidone; alkali metal salt of β-naphthalenesulfonic acid formalin condensate; polymers having a salt of a cationic functional group such as quaternary ammonium or an amino group as a side chain, and natural polymers such as shellac. Among them, a copolymer with an introduced carboxyl group and made up of a homopolymer of acrylic acid, methacrylic acid, or styrene acrylic acid and a monomer having a hydrophilic group is especially preferable.

The weight-average molecular weight of the above copolymer is preferably in the range 3,000-50,000 and more preferably in the range 7,000-15,000.

The mass ratio of the pigment to the dispersing agent is preferably between 1:0.06 and 1:3, and more preferably between 1:0.125 and 1:3.

The mass percentage of a colorant in an ink is preferably between 6% and 15%, and more preferably between 8% and 12%. When the mass percentage of a colorant is lower than 6%, the tinting strength and the viscosity of the ink become low. Low tinting strength results in low image density and low viscosity may cause feathering and bleeding. When the mass percentage of a colorant is more than 15%, the ink dries fast and may clog the nozzles on an ink jet recording apparatus. Also, the viscosity of the ink becomes very high and, as a result, the penetration capability of the ink becomes low. Drops of such an ink with high viscosity do not spread smoothly and lead to low image density.

Humectant

Any humectant may be used depending on the purpose. For example, a polyol compound, a lactam compound, a urea compound, and a saccharide may be used individually or in combination.

Examples of polyol compounds include polyhydric alcohols, polyhydric alcohol alkyl ethers, polyhydric alcohol arylethers, nitrogen containing heterocyclic compounds, amides, amines, sulfur-containing compounds, propylene carbonate, and ethylene carbonate. The above substances may be used individually or in combination.

Examples of polyhydric alcohols include ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers include ethylene glycol monophenyl ether and ethylene glycol monobenzyl ether.

Examples of nitrogen containing heterocyclic compounds include N-methyl-2-pyrrolidone, N-hydroxyethyl-2-pyrrolidone, 2-pyrrolidone, 1,3-dimethyl imidazolidinone, and ε-caprolactam.

Examples of amides include formamide, N-methylformamide, and N,N-dimethylformamide.

Examples of amines include monoethanolamine, diethanolamine, triethanolamine, monoethylamine, diethylamine, and triethylamine.

Examples of sulfur-containing compounds include dimethyl sulfoxide, sulfolane, and thiodiethanol.

Among them, the following substances have excellent solubility and beneficial effects in preventing degradation of spray performance caused by evaporation of moisture and are therefore preferable: glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, and N-hydroxyethyl-2-pyrrolidone.

As a lactam compound, for example, at least any one of the following may be used: 2-pyrrolidone, N-methyl-2-pyrrolidone, N-hydroxyethyl-2-pyrrolidone, and ε-caprolactam.

As a urea compound, for example, at least any one of the following may be used: urea, thiourea, ethyleneurea, and 1,3-dimethyl-2-imidazolidinone. The mass percentage of a urea compound in an ink is preferably between 0.5% and 50%, and more preferably between 1% and 20%.

Examples of saccharides include monosaccharide, disaccharide, oligosaccharide (including trisaccharide and tetrasaccharide), polysaccharide, and their derivatives. Among the above saccharides, glucose, mannose, fructose, ribose, xylose, arabinose, galactose, maltose, cellobiose, lactose, sucrose, trehalose, and maltotriose are preferable; and multitose, sorbitose, gluconolactone, and maltose are especially preferable.

Polysaccharides are saccharides in a broad sense and may include substances found in nature such as α-cyclodextrin and cellulose.

Examples of saccharide derivatives include reducing sugar (for example, sugar alcohol: $HOCH_2(CHOH)_nCH_2OH$ [n is an integer between 2 and 5]), oxidized saccharide (for example, aldonic acid and uronic acid), amino acid, and thio-acid. Among the above saccharide derivatives, a sugar alcohol is especially preferable. Examples of sugar alcohols include maltitol and sorbitol.

The mass percentage of a humectant in an ink is preferably between 10% and 50%, and more preferably between 20% and 35%. When the amount of a humectant is very small, nozzles tend to easily dry and the spray performance is reduced. When the amount of a humectant is too large, the viscosity of the ink may become too high.

Penetrant

As a penetrant, for example, a water-soluble organic solvent such as a polyol compound or a glycol ether compound may be used. Especially, a polyol compound with 8 or more carbon atoms or a glycol ether compound is preferable.

When the number of carbon atoms of a polyol compound is less than 8, the penetration capability of the ink may become insufficient. An ink with low penetration capability may smear a recording medium in duplex printing. Also, since such an ink does not spread smoothly on a recording medium, some pixels may be left blank, and as a result, the quality of characters may be reduced and the density of an image may become low.

Examples of polyol compounds with 8 or more carbon atoms include 2-ethyl-1,3-hexanediol (solubility: 4.2% (25° C.)) and 2,2,4-trimethyl-1,3-pentanediol (solubility: 2.0% (25° C.)).

Any glycol ether compound may be used depending on the purpose. Examples of glycol ether compounds include polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenyl ether and ethylene glycol monobenzyl ether.

There is no specific limit to the amount of a penetrant in an ink. However, the amount of a penetrant is preferably between 0.1 and 20 mass percent, and more preferably between 0.5 and 10 mass percent.

Surfactant

Any surfactant may be used depending on the purpose. For example, an anion surfactant, a nonion surfactant, an amphoteric surfactant, or a fluorinated surfactant may be used. Examples of anion surfactants include polyoxyethylene alkyl ether acetate, dodecylbenzenesulfonate, laurylate, and salt of polyoxyethylene alkyl ether sulfate.

Examples of nonion surfactants include acetylene glycol surfactant, polyoxyethylene alkyl ether, polyoxyethylene alkyl phenyl ether, polyoxyethylene alkyl ester, and polyoxyethylene sorbitan fatty acid ester.

Examples of acetylene glycol surfactants include 2,4,7,9-tetramethyl-5-desine-4,7-diol, 3,6-dimethyl-4-octine-3,6-diol, and 3,5-dimethyl-1-hexin-3-ol. For example, the following acetylene glycol surfactants are available as commercialized products: Surfynol 104, 82, 465, 485, TG (Air Products and Chemicals, Inc.).

Examples of amphoteric surfactants include lauryl amino propionate, lauryl dimethyl betaine, stearyl dimethyl betaine, and lauryl dihydroxyethyl betaine. More specifically, examples of amphoteric surfactants include lauryl dimethyl amine oxide, myristyl dimethyl amine oxide, stearyl dimethyl amine oxide, dihydroxyethyl lauryl amine oxide, polyoxyethylene coconut oil alkyldimethyl amine oxide, dimethylalkyl (coconut) betaine, and dimethyl lauryl betaine.

Especially, surfactants represented by chemical formulas (I), (II), (III), (IV), (V), and (VI) shown below are preferable.

(I)

In chemical formula (I), R1 indicates an alkyl group with 6-14 carbon atoms. The alkyl group may be branched; h is an integer between 3 and 12; M indicates alkali metal ion, quaternary ammonium, quaternary phosphonium, or alkanolamine.

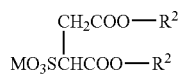
(II)

In chemical formula (II), R2 indicates an alkyl group with 5-16 carbon atoms. The alkyl group may be branched; M indicates alkali metal ion, quaternary ammonium, quaternary phosphonium, or alkanolamine.

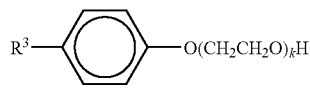
(III)

In chemical formula (III), R3 indicates a hydrocarbon radical, for example, an alkyl group with 6-14 carbon atoms. The alkyl group may be branched; k is an integer between 5 and 20.

(IV)

In chemical formula (IV), R4 indicates a hydrocarbon radical, for example, an alkyl group with 6-14 carbon atoms; j is an integer between 5 and 20.

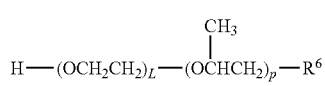
(V)

In chemical formula (V), R6 indicates a hydrocarbon radical, for example, an alkyl group with 6-14 carbon atoms. The alkyl group may be branched. L and p are integers between 1 and 20.

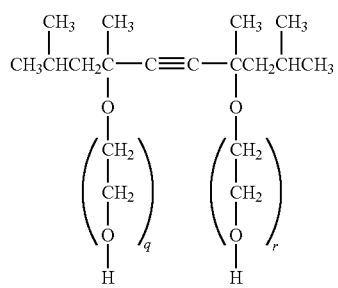
(VI)

In chemical formula (VI), q and r are integers between 0 and 40.

The surfactants represented by chemical formulas (I) and (II) are shown in free acid forms below.

(I-1)

(I-2)

(I-3)

(I-4)

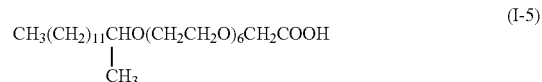
(I-5)

(I-6)

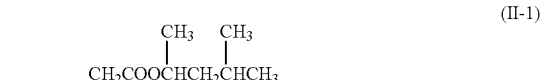
(II-1)

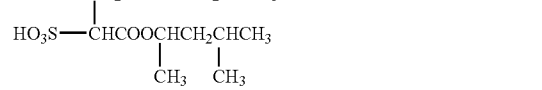
(II-2)

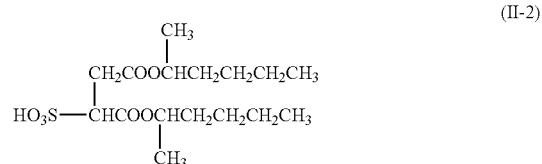
(II-3)

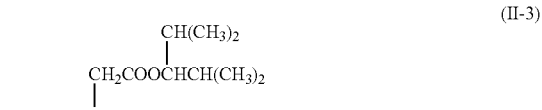
(II-4)

A fluorinated surfactant represented by chemical formula (A) below is preferably used.

(A)

In chemical formula (A), m indicates an integer between 0 and 10, and n indicates an integer between 1 and 40.

Examples of fluorinated surfactant include a perfluoroalkyl sulfonic acid compound, a perfluoroalkyl carvone compound, a perfluoroalkyl phosphoric ester compound, a perfluoroalkyl ethylene oxide adduct, and a polyoxyalkylene ether polymer compound having a perfluoroalkylether group as a side chain. Among them, a polyoxyalkylene ether polymer compound having a perfluoroalkylether group as a side chain has a low foaming property and a low fluorine compound bioaccumulation potential and is therefore especially preferable in terms of safety.

Examples of perfluoroalkyl sulfonic acid compounds include perfluoroalkyl sulfonic acid and perfluoroalkyl sulfonate.

Examples of perfluoroalkyl carvone compounds include perfluoroalkyl carboxylic acid and perfluoroalkyl carboxylate.

Examples of perfluoroalkyl phosphoric ester compounds include perfluoroalkyl phosphoric ester and salt of perfluoroalkyl phosphoric ester.

Examples of polyoxyalkylene ether polymer compounds having a perfluoroalkylether group as a side chain include a polyoxyalkylene ether polymer having a perfluoroalkylether group as a side chain, a sulfate ester salt of a polyoxyalkylene ether polymer having a perfluoroalkylether group as a side chain, and a salt of a polyoxyalkylene ether polymer having a perfluoroalkylether group as a side chain.

Counter ions of salts in the above fluorinated surfactants include Li, Na, K, NH4, NH3CH2CH2OH, NH2(CH2CH2OH)2, and NH(CH2CH2OH)3.

Fluorinated surfactants created for the present invention or those available as commercial products may be used.

Commercially available fluorinated surfactants include Surflon S-111, S-112, S-113, S-121, S-131, S-132, S-141, S-145 (Asahi Glass Co., Ltd.); Fluorad FC-93, FC-95, FC-98, FC-129, FC-135, FC-170C, FC-430, FC-431 (Sumitomo 3M Limited); Megafac F-470, F1405, F-474(Dainippon Ink and Chemicals, Incorporated); Zonyl TBS, FSP, FSA, FSN-100, FSN, FSO-100, FSO, FS-300, UR (DuPont); FT-110, FT-250, FT-251, FT-400S, FT-150, FT-400SW (NEOS Co. Ltd.); and PF-151N (Omnova Solutions, Inc.). Among them, in terms of reliability and color development, Zonyl FSN, FSO-100, and FSO (DuPont) are especially preferable.

Other Components

Examples of other components in an ink include, but are not limited to, a resin emulsion, a pH adjuster, an antiseptic or a fungicide, a rust inhibitor, an antioxidant, an ultraviolet absorber, an oxygen absorber, and a light stabilizer.

Resin Emulsion

A resin emulsion is made by dispersing resin micro-particles in water as a continuous phase and may contain a dispersing agent such as a surfactant.

The mass percentage of the resin micro-particles as a component of the disperse phase in a resin emulsion is preferably between 10% and 70%. The average particle diameter of the resin micro-particles, especially for ink jet recording apparatuses, is preferably between 10 and 1000 nm, and more preferably between 20 and 300 nm.

Examples of resin micro-particle materials include, but are not limited to, acrylic resin, vinyl acetate resin, styrene resin, butadiene resin, styrene-butadiene resin, vinyl chloride resin, styrene-acrylic resin, and acrylic silicone resin. Especially, acrylic silicone resin is preferable.

Resin emulsions created for the present invention or those available as commercial products may be used.

Examples of commercially available resin emulsions include Microgel E-1002, E-5002 (styrene-acrylic resin emulsion, Nippon Paint Co., Ltd.); VONCOAT 4001 (acrylic resin emulsion, Dainippon Ink and Chemicals, Incorporated); VONCOAT 5454 (styrene-acrylic resin emulsion, Dainippon Ink and Chemicals, Incorporated); SAE-1014 (styrene-acrylic resin emulsion, ZEON Corporation); Saibinol SK-200 (acrylic resin emulsion, Saiden Chemical Industry Co., Ltd.); Primal AC-22, AC-61 (acrylic resin emulsion, Rohm and Haas Company); Nanocryl SBCX-2821, 3689 (acrylic silicone resin, Toyo Ink Mfg. Co., Ltd.); and #3070 (methyl methacrylate polymer resin emulsion, Mikuni Color Ltd.).

The mass percentage of the resin microparticles in a resin emulsion is preferably between 0.1% and 50%, more preferably between 0.5% and 20%, and further preferably between 1% and 10%. When the mass percentage of the resin microparticles is less than 0.1%, the resin emulsion may not be able to prevent clogging or may not be able to improve spray stability. When the mass percentage of the resin microparticles is more than 50%, the preservation stability of the ink may be reduced.

Examples of antiseptics or fungicides include 1,2-benzisothiazolin-3-on, sodium dehydroacetate, sodium sorbate, 2-pyridinethiol-1-oxide sodium, sodium benzoate, and pentachlorophenol sodium.

Any pH adjuster that does not have negative effects on an ink and adjusts the pH of an ink to 7 or higher may be used depending on the purpose.

Examples of pH adjusters include amines such as diethanolamine and triethanolamine; hydroxides of alkali metals such as lithium hydroxide, sodium hydroxide, and potassium hydroxide; and carbonates of alkali metals such as ammonium hydroxide, quaternary ammonium hydroxide, quaternary phosphonium hydroxide, lithium carbonate, sodium carbonate, and potassium carbonate.

Examples of rust inhibitors include acidic sulfite, sodium thiosulfate, ammonium thiodiglycolic acid, diisopropyl ammonium nitrite, pentaerythritol tetranitrate, and dicyclohexyl ammonium nitrite.

As antioxidants, phenolic antioxidants (including hindered phenol antioxidants), amine antioxidants, sulfur antioxidants, and phosphorus antioxidants may be used.

Examples of phenolic antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenbis(3-methyl-6-tert-butylphenol), 3,9-bis[1,1-dimethyl-2-[β-(3-tert-butyl-4-hydroxy-5-methylphenyl)propionyloxyt]ethyl]2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3(3',5'-di-tert-butyl-4'-hydroxyphenyl)propionate]methane.

Examples of amine antioxidants include phenyl-β-naphthylamine, α-naphthylamine, N,N'-di-sec-butyl-p-phenylenediamine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisol, 2,2'-methylenebis(4-methyl-6-tert-butylphenol), 4,4'-butylidenbis(3-methyl-6-tert-butylphenol), 4,4'-thiobis(3-methyl-6-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane.

Examples of sulfur antioxidants include dilauryl-3,3'-thiodipropionate, distearyl thiodipropionate, lauryl stearyl thiodipropionate, dimyristyl-3,3'-thiodipropionate, distearyl β,β'-thiodipropionate, 2-mercaptobenzoimidazole, and dilauryl sulfide.

Examples of phosphorus antioxidants include triphenyl phosphite, octadecyl phosphite, triisodecyl phosphite, trilauryl trithiophosphite, and trinonyl phenyl phosphate.

Examples of ultraviolet absorbers include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of benzophenone ultraviolet absorbers include 2-hydroxy-4-n-octoxybenzophenone, 2-hydroxy-4-n-dodecyloxy benzophenone, 2,4-dihydroxybenzophenone, 2-hydroxy-4-methoxybenzophenone, and 2,2',4,4'-tetrahydroxybenzophenone.

Examples of benzotriazole ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of salicylate ultraviolet absorbers include phenyl salicylate, p-tert-butylphenylsalicylate, and p-octylphenylsalicylate.

Examples of cyanoacrylate ultraviolet absorbers include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of nickel complex salt ultraviolet absorbers include nickelbis(octylphenyl)sulfide, 2,2'-tiobis(4-tert-octylphalate)-n-butylaminenickel(II), 2,2'-tiobis(4-tert-octylphalate)-2-ethylhexylaminenickel(II), and 2,2'-tiobis(4-tert-octylphalate)triethanolaminenickel(II).

An ink of an ink media set according to an embodiment of the present invention contains at least water, a colorant, and a humectant, and may also include a penetrant, a surfactant, and other components. To prepare an ink, the above components are dispersed or dissolved in an aqueous medium. The solution may be stirred if needed. To disperse the components, for example, a sand mill, a homogenizer, a ball mill, a paint shaker, or an ultrasound dispersing machine may be used. To stir the solution, a normal stirring machine having stirring blades, magnetic stirrer, or a high-speed dispersing machine may be used.

At a temperature of 20° C., the viscosity of an ink is preferably between 1 and 30 cps (centi pore size), and more preferably between 2 and 20 cps. When the viscosity is higher than 20 cps, spray stability may be reduced.

The pH of an ink is preferably between 7 and 10.

Colors of inks include, but not limited to, yellow, magenta, cyan, and black. A multi-color image can be formed with two or more color inks. A full-color image can be formed with the four color ink.

EXAMPLES

Detailed embodiments of the present invention are described below. However, the present invention is not limited to the specifically disclosed embodiments.

Preparation Example 1

Preparation of Dispersion of Polymer Micro-Particles Containing Copper Phthalocyanine Pigment To prepare a dispersion of polymer micro-particles containing a copper phthalocyanine pigment, the air in a 1 L flask with a mechanical stirrer, a thermometer, a nitrogen gas inlet tube, a reflux tube, and a dropping funnel was replaced sufficiently with nitrogen gas; the 1 L flask was charged with 11.2 g of styrene, 2.8 g of acrylic acid, 12.0 g of lauryl methacrylate, 4.0 g of polyethylene glycol methacrylate, 4.0 g of styrene macromer (Toagosei Co., Ltd., brand name: AS-6), and 0.4 g of mercaptoethanol; and the temperature was raised to 65° C. Then, a mixed solution of 100.8 g styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (Toagosei Co., Ltd., brand name: AS-6), 3.6 g of mercaptoethanol, 2.4 g of azobisdimethylvaleronitrile, and 18.0 g of methyl ethyl ketone was dripped into the 1 L flask for 2.5 hours.

After the dripping was completed, a mixed solution of 0.8 g of azobisdimethylvaleronitrile and 18.0 g of methyl ethyl ketone was dripped into the 1 L flask for 0.5 hours. The resulting solution was matured for 1 hour at the temperature of 65° C., 0.8 g of azobisdimethylvaleronitrile was added to the solution, and then the solution was matured further for 1 hour. After the reaction stopped, 364 g of methyl ethyl ketone was put into the 1 L flask. As a result, 800 g of polymer solution with a concentration of 50 mass % was obtained. A portion of the obtained polymer solution was dried and its weight-average molecular weight (Mw) was measured by gel permeation chromatography (standard: polystyrene, solvent: tetrahydrofuran). The weight-average molecular weight was 15,000.

Next, 28 g of the obtained polymer solution, 26 g of copper phthalocyanine pigment, 13.6 g of 1 mol/L potassium hydroxide solution, 20 g of methyl ethyl ketone, and 30 g of ion-exchanged water were mixed and stirred sufficiently. The resulting substance was kneaded 20 times using the Tripole Roll Mill (Noritake Co., Limited, brand name: NR-84A). The obtained paste was put in 200 g of ion-exchanged water and stirred. Methyl ethyl ketone and water in the liquid was distilled away by using an evaporator. As a result, 160 g of polymer micro-particle dispersion with a cyan color was obtained. The solid content of the polymer micro-particle dispersion was 20.0 mass %.

The average particle diameter (D50%) of the polymer micro-particles in the polymer micro-particle dispersion was measured with a particle size distribution analyzer (Microtrac UPA, Nikkiso Co., Ltd.). The average particle diameter was 93 nm.

Preparation Example 2

Preparation of Dispersion of Polymer Micro-Particles Containing Dimethyl Quinacridone Pigment A polymer micro-particle dispersion with magenta color was prepared in substantially the same manner as the preparation example 1, except that C. I. Pigment Red 122 was used instead of a copper phthalocyanine pigment.

The average particle diameter (D50%) of the polymer micro-particles in the polymer micro-particle dispersion was measured with a particle size distribution analyzer (Microtrac UPA, Nikkiso Co., Ltd.). The average particle diameter was 127 nm.

Preparation Example 3

Preparation of Dispersion of Polymer Micro-Particles Containing Monoazo Yellow Pigment A polymer micro-particle dispersion with a yellow color was prepared in substantially the same manner as the preparation example 1, except that C. I. Pigment Yellow 74 was used instead of a copper phthalocyanine pigment.

The average particle diameter (D50%) of the polymer micro-particles in the polymer micro-particle dispersion was measured with a particle size distribution analyzer (Microtrac UPA, Nikkiso Co., Ltd.). The average particle diameter was 76 nm.

Preparation Example 4

Preparation of Dispersion of Carbon Black Processed with Sulfonating Agent

To prepare a carbon black dispersion, 150 g of a commercially available carbon black pigment (Printex #85, Degussa) was mixed in 400 ml of sulfolane; the solution was micro-dispersed with a beads mill; 15 g of amidosulfuric acid was added to the solution; and then the solution was stirred for 10 hours at 140-150° C. The obtained slurry was put in 1000 ml of ion-exchanged water, and the solution was centrifuged at 12,000 rpm. As a result, a surface-treated carbon black wet cake was obtained. The obtained carbon black wet cake was dispersed again in 2,000 ml of ion-exchanged water; the pH of the solution was adjusted with lithium hydroxide; the solution was desalted/condensed using an ultrafilter; and then the solution was filtered with a nylon filter with an average pore diameter of 1 μm. As a result, a black carbon dispersion with a pigment concentration of 10 mass % was obtained.

The average particle diameter (D50%) of the micro-particles in the carbon black dispersion was measured with a particle size distribution analyzer (Microtrac UPA, Nikkiso Co., Ltd.). The average particle diameter was 80 nm.

Production Example 1

Production of Cyan Ink

To produce a cyan ink, 20.0 mass % of the dispersion of polymer micro-particles containing a copper phthalocyanine pigment prepared in the preparation example 1, 23.0 mass % of 3-methyl-1,3-butanediol, 8.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 μm.

Production Example 2

Production of Magenta Ink

To produce a magenta ink, 20.0 mass % of the dispersion of polymer micro-particles containing a dimethyl quinacridone pigment prepared in the preparation example 2, 22.5 mass % of 3-methyl-1,3-butanediol, 9.0 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-ethyl-1,3-propanediol, and a certain amount of ion-exchanged water were mixed (100 mass % in total); and the mixture was filtered using a membrane filter with an average pore diameter of 0.8 μm.

Production Example 3

Production of Yellow Ink

To produce a yellow ink, 20.0 mass % of the dispersion of polymer micro-particles containing a monoazo yellow pigment prepared in the preparation example 3, 24.5 mass % of 3-methyl-1,3-butanediol, 8 mass % of glycerin, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 μm.

Production Example 4

Production of Black Ink

To produce a black ink, 20.0 mass % of the carbon black dispersion prepared in the preparation example 4, 22.5 mass % of 3-methyl-1,3-butanediol, 7.5 mass % of glycerin, 2.0 mass % of 2-pyrrolidone, 2.0 mass % of 2-ethyl-1,3-hexanediol, 2.5 mass % of FS-300 (DuPont) used as a fluorinated surfactant, 0.2 mass % of Proxel LV (Avecia KK) used as an antiseptic or a fungicide, 0.5 mass % of 2-amino-2-methyl-1,3-propanediol, and a certain amount of ion-exchanged water were mixed (100 mass % in total); and the mixture was filtered using a membrane filter with an average pore diameter of 0.8 μm.

The surface tensions and viscosities of the inks produced in the production examples 1 through 4 were measured as described below. The results are shown in table 3 below.

<Measurement of Viscosity>

The viscosities of the inks were measured at 25° C. with the R-500 Viscometer of Toki Sangyo Co., Ltd. (cone 1° 34'× R24, 60 rpm, after 3 minutes).

<Measurement of Surface Tension>

The static surface tensions of inks were measured at 25° C. with a surface tensiometer (CBVP-Z of Kyowa Interface Science Co., Ltd.) using a platinum plate.

TABLE 3

|  | Viscosity (mPa · s) | Surface tension (mN/m) |
|---|---|---|
| Production example 1 | 8.05 | 25.4 |
| Production example 2 | 8.09 | 25.4 |
| Production example 3 | 8.11 | 25.7 |
| Production example 4 | 8.24 | 25.4 |

Production of the Support Material

The support material with a grammage of 79 g/m² was produced using a Fourdrinier from 0.3 mass % slurry made of materials in the formula below. In the size press step of the papermaking process, an oxidized starch solution was applied on the support material. The solid content of the oxidized starch on the support material was 1.0 g/m².

| Leaf bleached kraft pulp (LBKP) | 80 mass % |
| Needle bleached kraft pulp (NBKP) | 20 mass % |
| Precipitated calcium carbonate (brand name: TP-121, Okutama Kogyo Co., Ltd.) | 10 mass % |
| Aluminum sulfate | 1.0 mass % |
| Amphoteric starch (brand name: Cato3210, Nippon NSC Ltd.) | 1.0 mass % |
| Neutral rosin size (brand name: NeuSize M-10, Harima Chemicals, Inc.) | 0.3 mass % |
| Retention aid (brand name: NR-11LS, HYMO Co., Ltd.) | 0.02 mass % |

Production Example 5

Production of Recording Medium 1

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 8 mass % of styrene-butadiene copolymer emulsion, used as an adhesive, with a glass-transition temperature (Tg) of −5° C.; 1 mass % of phosphoric esterified starch; 0.5 mass % of calcium stearate used as an aid; and water.

To produce the recording medium 1, the obtained coating liquid was applied on both sides of the above support material so that 8 g/m² of solid content of the coating liquid adheres to each side using a blade coater; and the base material was dried by hot air and supercalendered.

Production Example 6

Production of Recording Medium 2

A coating liquid with a solid content concentration of 60 mass % was produced by mixing 70 mass % of clay used as a pigment in which clay 97 mass % of particles have a diameter of 2 μm or smaller; 30 mass % of heavy calcium carbonate with an average particle diameter of 1.1 μm; 7 mass % of styrene-butadiene copolymer emulsion, used as an adhesive, with a glass-transition temperature (Tg) of −5° C.; 0.7 mass % of phosphoric esterified starch; 0.5 mass % of calcium stearate used as an aid; and water.

To produce the recording medium 2, the obtained coating liquid was applied on both sides of the above support material so that 8 g/m² of solid content of the coating liquid adheres to each side using a blade coater; and the base material was dried by hot air and supercalendered.

First Embodiment

Ink Set, Recording Medium, and Image Recording

By a conventional method, an ink set 1 made up of the cyan ink produced in the production example 1, the magenta ink produced in the production example 2, the yellow ink produced in the production example 3, and the black ink produced in the production example 4 was prepared.

Images were printed on the recording medium 1 with the ink set 1 (largest ink drop size: 18 pl) at an image resolution of 600 dpi using a 300 dpi drop on demand printer prototype apparatus having nozzles with a nozzle resolution of 384 according to an embodiment of the present invention. The total amount of ink per unit area for a secondary color was limited to 140% and solid-color images and characters were formed.

Second Embodiment

Ink Set, Recording Medium, and Image Recording

Images were formed in substantially the same manner as the first embodiment, except that the recording medium 2 was used as a recording medium.

Third Embodiment

Ink Set, Recording Medium, and Image Recording

Images were formed in substantially the same manner as the first embodiment, except that a commercially available coated paper for gravure printing (brand name: Space DX, grammage=56 g/m², Nippon Paper Industries Co., Ltd.) (hereafter called a recording medium 3) was used as a recording medium.

Comparative Example 1

Ink Set, Recording Medium, and Image Recording

Images were formed in substantially the same manner as the first embodiment, except that a commercially available coated paper for offset printing (brand name: Aurora Coat, grammage=104.7 g/m², Nippon Paper Industries Co., Ltd.) (hereinafter it is called a recording medium 4) was used as a recording medium.

Comparative Example 2

Images were formed in substantially the same manner as the first embodiment, except that a commercially available mat coated paper for ink-jet printing (brand name: Paper for exclusive use of super Fine, Seiko Epson Co., Ltd.) (hereafter called a recording medium 5) was used as a recording medium.

For each of the recording medium 1, the recording medium 2, the recording medium 3, the recording medium 4 and the recording medium 5, the amount of transferred pure water and the amount of transferred cyan ink produced in the production example 1 were measured as described below using a dynamic scanning absorptometer. The results are shown in table 4.

<Measurement of Amounts of Transferred Pure Water and Cyan Ink with Dynamic Scanning Absorptometer>

For each of the above recording media, the amounts of transferred pure water and cyan ink were measured using a dynamic scanning absorptometer (K350 series, type D, Kyowa Co., Ltd.) at temperature of 25° C., relative humidity of 50% RH. The amounts of transferred pure water and cyan ink at a contact time of 100 ms and 400 ms obtained by interpolation, using the transferred amounts measured at time points around each contact time.

TABLE 4

| | | PURE WATER | | INK (PRODUCTION EXAMPLE 1) (r = 25) | |
|---|---|---|---|---|---|
| | RECORDING MEDIA | CONTACT TIME: 100 ms | CONTACT TIME: 400 ms | CONTACT TIME: 100 ms | CONTACT TIME: 400 ms |
| FIRST EMBODIMENT | RECORDING MEDIUM 1 | 10.1 ml/m² | 20.2 ml/m² | 7.2 ml/m² | 14.8 ml/m² |
| SECOND EMBODIMENT | RECORDING MEDIUM 2 | 25.2 ml/m² | 28.5 ml/m² | 14.6 ml/m² | 19.4 ml/m² |
| THIRD EMBODIMENT | RECORDING MEDIUM 3 | 10.4 ml/m² | 21.8 ml/m² | 6.4 ml/m² | 8.8 ml/m² |

TABLE 4-continued

|  | RECORDING MEDIA | PURE WATER | | INK (PRODUCTION EXAMPLE 1) (r = 25) | |
|---|---|---|---|---|---|
|  |  | CONTACT TIME: 100 ms | CONTACT TIME: 400 ms | CONTACT TIME: 100 ms | CONTACT TIME: 400 ms |
| COMPARATIVE EXAMPLE 1 | COMPARATIVE EXAMPLE 4 | 2.8 ml/m$^2$ | 3.4 ml/m$^2$ | 2.7 ml/m$^2$ | 3.1 ml/m$^2$ |
| COMPARATIVE EXAMPLE 2 | COMPARATIVE EXAMPLE 5 | 41.0 ml/m$^2$ | 44.8 ml/m$^2$ | 38.1 ml/m$^2$ | 46.2 ml/m$^2$ |

Qualities of the images printed in the first through third embodiments and comparative examples were evaluated in terms of beading, bleeding, spur marks, and glossiness. The results are shown in table 5.

<Beading>

The degree of beading in the printed green solid-color image was evaluated by eye observation according to the evaluation criteria below.

[Evaluation Criteria]

AA: No beading is observed and image is evenly printed.
BB: Beading is slightly observed.
CC: Beading is clearly observed.
DD: Excessive beading is observed.

<Bleeding>

The degree of bleeding of the printed black characters in the yellow background was evaluated by eye observation according to the evaluation criteria below.

[Evaluation Criteria]

AA: No bleeding is observed and characters are clearly printed.
BB: Bleeding is slightly observed.
CC: Bleeding is clearly observed.
DD: Excessive bleeding is observed and outlines of characters are blurred.

<Spur Marks>

The degree of spur marks in the printed images was evaluated by eye observation according to the evaluation criteria below.

[Evaluation Criteria]

AA: No spur mark is observed.
BB: Spur marks are observed slightly.
CC: Spur marks are clearly observed.
DD: Excessive spur marks are observed.

<Glossiness>

60 degrees mirror surface glossiness (JIS Z8741) of matted picture part of cyan of each picture print was measured.

TABLE 5

|  | BEADING | BLEEDING | SPUR MARK | GLOSSINESS |
|---|---|---|---|---|
| FIRST EMBODIMENT | BB | BB | BB | 29.4 |
| SECOND EMBODIMENT | AA | AA | AA | 27.8 |
| THIRD EMBODIMENT | BB | BB | BB | 22.3 |
| COMPARATIVE EXAMPLE 1 | DD | CC | DD | 32.1 |
| COMPARATIVE EXAMPLE 2 | AA | AA | AA | 1.7 |

According to the table 5, in each of the first through third embodiments, combinations of the ink and the recording medium were performed; that is, the combination is such that the ink containing at least water, the colorant, and the humectant and having the surface tension between 20 and 35 mN/m at 25° C.; and the recording medium, in which the amount of ink transferred onto which recording medium measured by a dynamic scanning absorptometer is between 4 and 15 ml/m$^2$ at a contact time of 100 ms and between 7 and 20 ml/m$^2$ at a contact time of 400 ms were used as an ink-recording medium set. Compared with the ink-recording medium sets used in the comparative examples 1 through 2, the ink-recording medium sets used in the first through third embodiments showed excellent evaluation results in terms of beading, bleeding, spur marks, and glossiness.

The present invention is not limited to the specifically disclosed embodiment, and variations and modifications may be made without departing from the scope of the present invention.

For example, it is explained that the nozzle plate 2 is treated by the Ni electrocasting, but if materials of the ink repellent layer can be applied, for example, even various metals such as SUS (Super Use Stainless) are preferable, and also various resins are preferable.

In addition, when the ink repellent layer is formed on the surface of the base material of the ink jet head, materials of the ink repellent layer may be coated after removing the oxidation membrane of the surface of the base material (the nozzle plate 2) or the ink repellent layer may be coated after forming the intermediate layer.

As the intermediate layer (primer), for example, "primer D" manufactured by Toray Dow Corning can be used and it is recognized that the adhesive is good. Also, materials of the ink repellent layer may be coated after the under coat of the surface of the base material is done rudely by Ni strike plating.

The present application is based on Japanese priority application No. 2006-023563 filed on Jan. 31, 2006, the entire contents of which are hereby incorporated by reference.

The invention claimed is:

1. A recording method with an ink ejected by an ink jet head, in which ink jet head an ink repellent layer is formed on a surface of a nozzle plate of the ink jet head so that an opening portion for liquid ejections is established, the ink jet head being formed such that a cross-sectional area for a neighborhood of the opening portion of the ink repellent layer in a plane which is perpendicular to a centerline of the opening portion grows big sequentially as the cross-sectional area is further separated from the surface of the nozzle plate, wherein an amount of the ink transferred onto a recording medium during a contact time of 100 ms measured by a dynamic scanning absorptometer with environmental conditions of temperature 23° C. and relative humidity 50% RH is between 4 and 15 ml/m$^2$, and an amount of the ink transferred onto the recording medium during a contact time of 400 ms measured by the dynamic scanning absorptometer with the environmental conditions of temperature 23° C. and relative humidity 50% RH is between 7 and 20 ml/m$^2$.

2. The recording method as claimed in claim 1, wherein an amount of a pure water transferred onto the recording medium during the contact time of 100 ms measured by the dynamic scanning absorptometer with the environmental conditions 23° C. and 50% RH is between 4 and 26 ml/m$^2$, and an amount of the pure water transferred onto the recording medium during the contact time of 400 ms measured by the dynamic scanning absorptometer with the environmental conditions 23° C. and 50% RH is between 5 and 29 ml/m$^2$.

3. The recording method as claimed in claim 1, wherein the recording medium is composed of a support material and at least one coating layer on a surface of the support material.

4. The recording method as claimed in claim 3, wherein the recording medium is composed of at least the support material and the coating layer, and a solid content of the coating layer is between 0.5 and 20 g/m$^2$.

5. The recording method as claimed in claim 1, wherein a grammage of the recording medium is between 50 and 250 g/m$^2$.

6. The recording method as claimed in claim 1, wherein the recording medium is supercalendered.

7. The recording method as claimed in claim 1, wherein the recording medium contains kaolin as a pigment.

8. The recording method as claimed in claim 1, wherein the recording medium contains heavy calcium carbonate as a pigment.

9. The recording method as claimed in claim 1, wherein the recording medium contains a water-based resin.

10. The recording method as claimed in claim 9, wherein the water-based resin is a water-soluble resin or a water-dispersible resin.

11. The recording method as claimed in claim 1, wherein the ink contains at least water, a colorant, and a humectant.

12. The recording method as claimed in claim 1, wherein a surface tension of the ink at a temperature of 25° C. is between 15 and 40 mN/m.

13. The recording method as claimed in claim 1, wherein the ink contains a dispersible colorant and an average particle diameter of the dispersible colorant is between 0.01 and 0.16 μm.

14. The recording method as claimed in claim 1, wherein a viscosity of the ink at a temperature of 25° C. is between 1 and 30 mPa·sec.

15. The recording method as claimed in claim 1, wherein the ink contains a fluorinated surfactant.

16. A printed matter recorded in a recording medium with an ink ejected by an ink jet head, in which ink jet head an ink repellent layer is formed on a surface of a nozzle plate of the ink jet head so that an opening portion for liquid ejections is established, the ink jet head being formed such that a cross-sectional area for a neighborhood of the opening portion of the ink repellent layer in a plane which is perpendicular to a centerline of the opening portion grows big sequentially as the cross-sectional area is further separated from the surface of the nozzle plate, wherein an amount of the ink transferred onto the recording medium during a contact time of 100 ms measured by a dynamic scanning absorptometer with environmental conditions of temperature 23° C. and relative humidity 50% RH is between 4 and 15 ml/m$^2$, and an amount of the ink transferred onto the recording medium during a contact time of 400 ms measured by the dynamic scanning absorptometer with the environmental conditions of temperature 23° C. and relative humidity 50% RH is between 7 and 20 ml/m$^2$.

* * * * *